(12) United States Patent
Harrison et al.

(10) Patent No.: US 11,067,802 B1
(45) Date of Patent: Jul. 20, 2021

(54) FULL HUMAN FIELD OF VIEW (FOV) WRAP AROUND HEAD-MOUNTED DISPLAY APPARATUS WITH A CONVEX DISPLAY DEVICE

(71) Applicant: LOCKHEED MARTIN CORPORATION, Bethesda, MD (US)

(72) Inventors: Gregory A. Harrison, Oviedo, FL (US); David A. Smith, Cary, NC (US); Joshua D. Kitain, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 100 days.

(21) Appl. No.: 16/248,025

(22) Filed: Jan. 15, 2019

(51) Int. Cl.
*G02B 27/01* (2006.01)

(52) U.S. Cl.
CPC .... *G02B 27/0172* (2013.01); *G02B 2027/013* (2013.01); *G02B 2027/0123* (2013.01); *G02B 2027/0132* (2013.01); *G02B 2027/0178* (2013.01)

(58) Field of Classification Search
CPC .............. G02B 27/017; G02B 27/0172; G02B 2027/0123; G02B 2027/013; G02B 2027/0132; G02B 2027/0178
See application file for complete search history.

(56) References Cited

U.S. PATENT DOCUMENTS

| 5,959,762 | A | 9/1999 | Bandettini et al. |
| 7,495,638 | B2 | 2/2009 | Lamvik et al. |
| 8,362,974 | B2 | 1/2013 | Miyake et al. |
| 8,625,200 | B2 | 1/2014 | Smith et al. |
| 8,781,794 | B2 | 7/2014 | Harrison et al. |
| 2012/0013988 | A1 | 1/2012 | Hutchin |
| 2016/0109710 | A1* | 4/2016 | Smith ................ G02B 27/0172 359/633 |
| 2017/0097449 | A1 | 4/2017 | Ouderkirk et al. |
| 2017/0115489 | A1* | 4/2017 | Hu ........................ G06T 3/0093 |
| 2019/0064526 | A1* | 2/2019 | Connor ................ G06T 19/006 |
| 2020/0033607 | A1* | 1/2020 | Takeda .................. G02B 13/22 |
| 2020/0341278 | A1* | 10/2020 | Tanaka ..................... H04N 5/64 |

* cited by examiner

*Primary Examiner* — Lixi C Simpson
(74) *Attorney, Agent, or Firm* — Foley & Lardner LLP

(57) ABSTRACT

A head-mounted display (HMD) apparatus comprising at least one optical system, each optical system comprising a lens having a reflective optical surface and an HMD device associated with and distanced from the reflective optical surface. The HMD device comprises a substrate having horizontal and/or vertical convex curvatures having a curved geometric profile which continuously curves with smooth transitions in horizontal and/or vertical dimensions. The curved profile is dimensioned to curve around a temple of a wearer and extend in a direction toward an ear of a wearer. The substrate comprising a plurality of pixel elements arranged along the horizontal convex curvature and being controlled to selectively radiate light representative of computer-generated content (CGC) to the associated reflective optical surface such that those selected pixel elements for display emanate rays of the light for subsequent reflection from the reflective optical surface toward a respective one eye of the wearer.

20 Claims, 17 Drawing Sheets

Left Far Peripheral Vision Field

Right Far Peripheral Vision Field

1400

1401

Providing first convex display device comprising a first substrate with a horizontal convex curvature having a curved geometric profile which continuously curves with smooth transitions in a horizontal dimension, the curved profile dimensioned to curve around a first temple of a wearer and extend in a direction toward a first ear of a wearer and the first convex display device comprising a plurality of first pixel elements having a first non-Euclidean arrangement along the first substrate

1402

Selectively displaying, from the first convex display, first computer-generated content (CGC) by selected first pixel elements of the plurality of first pixel elements to orient emanated light, representative of the first CGC to a first reflective optical surface of a first optical see-through lens of a head-mounted display (HMD) apparatus associated with a first eye of a wearer

1404

Reflecting from the first reflective optical surface the emanated light from the selected first pixel elements toward the first eye of a wearer to appear in a field of view wherein the field of view comprises at least a far peripheral vision field of view of the first eye and the non-Euclidean arrangement of the plurality of first pixel elements and paired predetermined surface locations on the first reflective optical surface produces a predetermined brightness intensity of the reflection from said those predetermined surface locations paired with said those selected first pixel elements on the first substrate To Block 1406 of FIG. 14B

FIG. 14A

From Block 1404 of FIG. 14A

↓ 1406

Providing a second convex display device comprising a second substrate with a horizontal convex curvature having a curved geometric profile which continuously curves with smooth transitions in the horizontal dimension, the curved profile dimensioned to curve around a second temple of the wearer and extend in a direction toward a second ear of the wearer and the second convex display device comprising a plurality of second pixel elements having a second non-Euclidean arrangement along the second substrate

↓ 1408

Selectively displaying, from the second convex display device having the plurality of second pixel elements arranged on the second convex display device in a second non-Euclidean arrangement, second CGC by selected second pixel elements to emanate light to a second reflective optical surface of a second optical see-through lens of the head-mounted display (HMD) apparatus associated with a second eye of the wearer

↓ 1410

Reflecting from the second reflective optical surface the emanated light from the selected second pixel elements in a second field of view wherein the field of view comprises at least a far peripheral vision field of view of the second eye and the non-Euclidean arrangement of the plurality of second pixel elements and paired predetermined surface locations on the second reflective optical surface produces a predetermined brightness intensity of the reflection from said those predetermined surface locations paired with said those selected second pixel elements on the second substrate

FIG. 14B 1402  1403

Selectively displaying, from the first convex display, by a set of pixel elements configured, upon selection, to orient emanated light representative of the CGC or a portion of the CGC toward the first reflective optical surface for reflection of the CGC or the portion of the CGC to appear in a human vertical vision field of view of the first eye wherein the first convex substrate further comprising a top side and a bottom side with a vertical convex curvature being curved continuously with smooth transitions in a vertical dimension between the top side and the bottom side and in a direction toward the forehead of the wearer

FIG. 14C 1408  1409

Selectively displaying, from the second convex display, by a set of pixel elements configured, upon selection, to orient emanated light representative of the CGC or a portion of the CGC toward the second reflective optical surface for reflection of the CGC or the portion of the CGC to appear in a human vertical vision field of view of the second eye wherein the second convex substrate further comprising a top side and a bottom side with a vertical convex curvature being curved continuously with smooth transitions in a vertical dimension between the top side and the bottom side and in a direction toward the forehead of the wearer

FIG. 14D

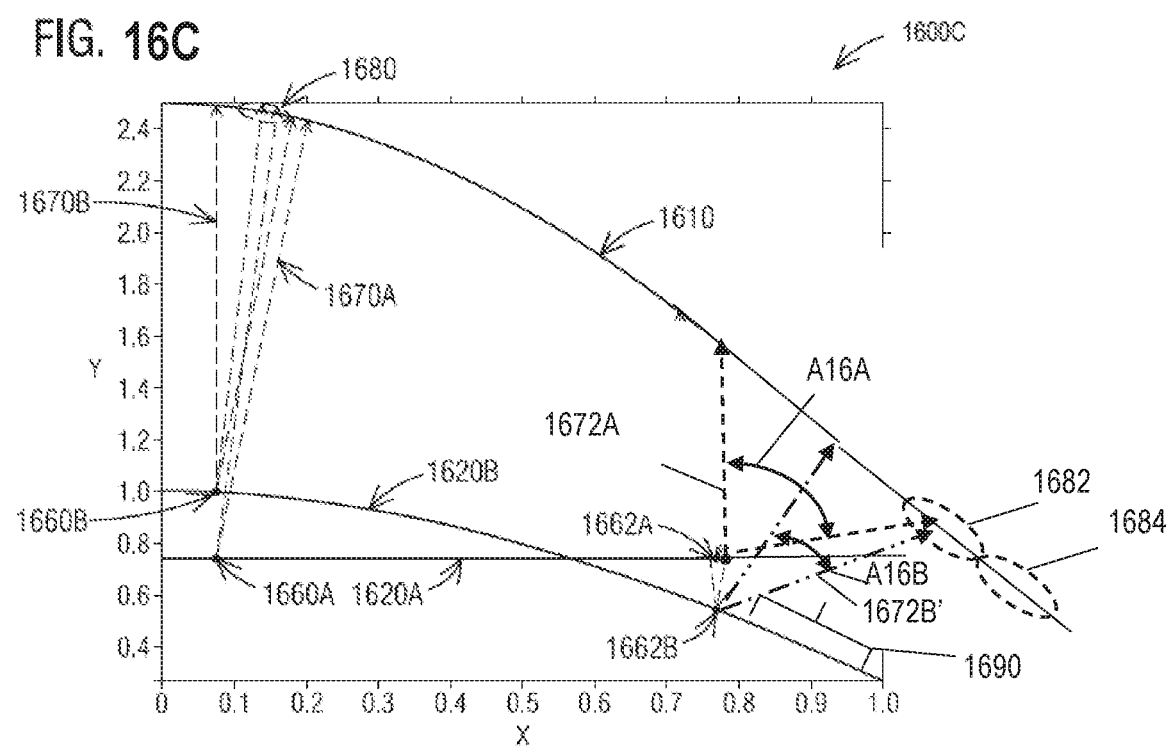

FULL HUMAN FIELD OF VIEW (FOV) WRAP AROUND HEAD-MOUNTED DISPLAY APPARATUS WITH A CONVEX DISPLAY DEVICE

BACKGROUND

Embodiments relate to a head-worn convex display device and a head-mounted display (HMD) apparatus using the convex display device to provide up to a full human field of view (FOV) wrap around to the far peripheral vision fields of the left and right eyes of a wearer.

The reason the HMD apparatuses have been so limited is the fundamental fact that the human field of view is remarkably large. Thus, the human field of view of a human eye, including both the eye's foveal and peripheral vision, is on the order of approximately 150° in the horizontal direction and on the order of approximately 120°-130° in the vertical direction. For two eyes, the field of view is greater than 180°. The horizontal field of view for two eyes can be between 190°-200°.

Specifically, the human horizontal field of view extends from 60 degrees nasally to approximately 107 degrees temporally from straight ahead. With a flat display tangential to the forehead and pointed forward, the most an LED or LCD display screen can reach in one direction is approximately 88 degrees which is less than 107 degrees. Thus, when using a flat display screen in a near-to-the-eye reflector head-mounted display (HMD), the full human field of view cannot be reached as there is approximately 19 degrees of peripheral field of view that cannot be illuminated on each eye. Therefore, multiple displays have been considered for extending the field of view of an HMD apparatus which adds complexity to registration of the displayed images between multiple flat displays. Using multiple flat displays per eye also requires the HMD frame to be bulky.

SUMMARY

Embodiments relate to a head-worn convex display device and a head-mounted display (HMD) apparatus using the convex display device to provide up to a full human field of view (FOV) wrap around to the far peripheral vision fields of the left and right eyes of a wearer.

An aspect of the embodiments includes a head-mounted display (HMD) apparatus comprising at least one optical system, each optical system comprising a lens having a reflective optical surface and an HMD device associated with and distanced from the reflective optical surface. The HMD device comprises a substrate with a horizontal convex curvature having a curved geometric profile which continuously curves with smooth transitions in a horizontal dimension. The curved profile is dimensioned to curve around a respective temple of a wearer and extend in a direction toward a respective ear of a wearer. The substrate comprising a plurality of pixel elements arranged along the horizontal convex curvature and being controlled to selectively radiate light representative of computer-generated content (CGC) to the associated reflective optical surface such that those selected pixel elements for display emanate rays of the light for subsequent reflection and collimation from the reflective optical surface toward a respective one eye of the wearer.

Another aspect of the embodiments includes a head-worn display device for a head-mounted display (HMD) apparatus having at least one optical system including a lens with a curved reflective optical surface associated with the head-worn display device. The head-worn display device comprises a convex substrate with a horizontal convex curvature having a curved geometric profile which continuously curves with smooth transitions in a horizontal dimension. The curved geometric profile is dimensioned to curve around a respective temple of a wearer and extend in a direction toward a respective ear of a wearer. A plurality of pixel elements is coupled to the convex substrate and arranged to have a non-Euclidean arrangement along the horizontal convex curvature. The plurality of pixel elements is controlled to selectively radiate light representative of computer-generated content (CGC) to the reflective optical surface having predetermined surface locations with each predetermined surface location paired with a pixel element of the plurality of pixel elements. Those selected pixel elements for display of the CGC being configured to emanate rays of the light in a field of view for subsequent reflection from the paired predetermined surface locations, toward the eye of the wearer. The field of view comprises at least a far peripheral vision field of view and the non-Euclidean arrangement of the plurality of pixel elements and paired predetermined surface locations produces a predetermined brightness intensity of the reflection from said those predetermined surface locations paired with said those selected pixel elements on the convex substrate.

Another aspect of the embodiments includes a method comprising: providing a first convex display device comprising a first substrate having a horizontal convex curvature with a curved geometric profile which continuously curves with smooth transitions in a horizontal dimension. The curved profile dimensioned to curve around a first temple of a wearer and extend in a direction toward a first ear of a wearer. The first convex display device comprising a plurality of first pixel elements having a first non-Euclidean arrangement along the first substrate. The method includes selectively displaying, from the first convex display, first computer-generated content (CGC) by selected first pixel elements of the plurality of first pixel elements to orient emanated light, representative of the first CGC to a first reflective optical surface of a first optical see-through lens of a head-mounted display (HMD) apparatus associated with a first eye of a wearer. The method includes reflecting from the first reflective optical surface the emanated light from the selected first pixel elements toward the first eye of a wearer to appear in a field of view. The field of view comprises at least a location in a far peripheral vision field of view of the first eye and the non-Euclidean arrangement of the plurality of first pixel elements being paired with predetermined surface locations on the first reflective optical surface produces a predetermined brightness intensity of the reflection from said those predetermined surface locations paired with said selected first pixel elements on the first substrate.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIGS. 14A-14D illustrate a flowchart of a method for displaying in the full human field of view using convex display device;

FIG. 16C illustrates a graph of a side view of a curved reflective surface, a convex display device, and a flat display device that is calculated to be at the mean y height of the convex display device of FIG. 16A including first reflected light rays originating from the convex display device relative to location on the curved reflective surface below the flat display device.

DETAILED DESCRIPTION

Figure 1A:
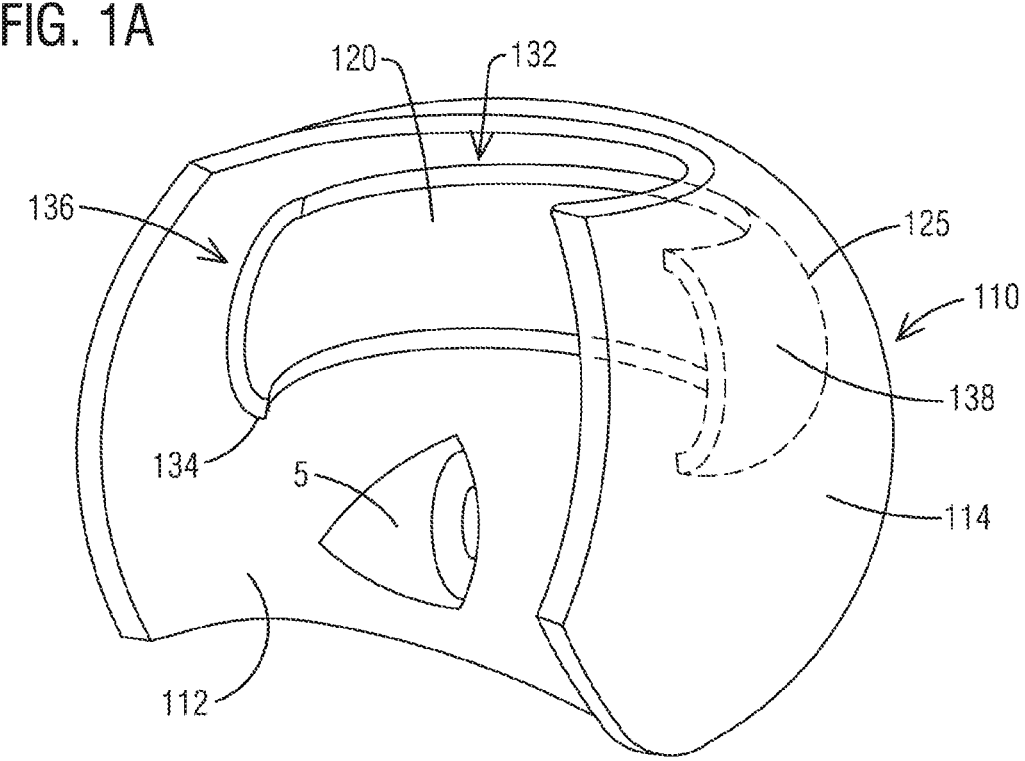
FIG. 1A illustrates a first perspective view of a lens relative to a convex display device for a head-mounted display (HMD) apparatus relative to a wearer's eye.

Embodiments are described herein with reference to the attached figures. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

In some embodiments, the headed-mount display apparatus can be, for example, an optical see-through, augmented reality, binocular viewer. Because an optical see-through, augmented reality, binocular viewer is typically the most complex form of an HMD apparatus, the disclosure will primarily discuss embodiments of this type, it being understood that the principles discussed herein are equally applicable to optical see-through, augmented reality, monocular viewers, video see-through, augmented reality, binocular and monocular viewers, and binocular and monocular "virtual reality" systems.

The head-mounted display (HMD) apparatus described herein may be configured to display computer-generated data or images anywhere in the human field of view including within the full human horizontal field of view and the full human vertical field of view. The full human horizontal field of view includes the full peripheral vision fields for a wearer.

The head-mounted display (HMD) apparatus described herein may be configured to eliminate virtual world disappearance as the wearer's eyes are turned in a direction toward a corner of one of the eyes. In other words, computer-generated data or imagery would not cut off as they turn their eyes to one of the corners during use. The terms "wearer" and "user" or derivates thereof may be used interchangeably herein.

The head-mounted display (HMD) apparatus described herein may be configured to nearly seamlessly and continuously maintain augmented reality (AR) elements in the full human field of view vertically and/or horizontally as the wearer's eyes are turned in a direction toward a corner of one of the eyes, turned upward to the fullest extent, turned downward to the fullest extent and/or as the wearer's head turns. In other words, computer-generated content, data or imagery (i.e. represented as augmented reality (AR) elements) appears as a natural extension of the real-world view anywhere in the full human field of view including the limits of the full human field of view. The real-world view is seen by the wearer through the lenses.

The head-mounted display (HMD) apparatus described herein may be configured to nearly seamlessly and continuously maintain a virtual environment in the full human field of view vertically and/or horizontally as the wearer's eyes are turned in a direction toward a corner of one of the eyes, turned upward to the fullest extent, turned downward to the fullest extent and/or as the wearer's head turns. In other words, computer-generated content, data or imagery (i.e. represented as a virtual environment) appears anywhere in the full human field of view including the limits of the full human field of view by reflection on a reflective optical surface of the HMD apparatus.

Figure 1B:
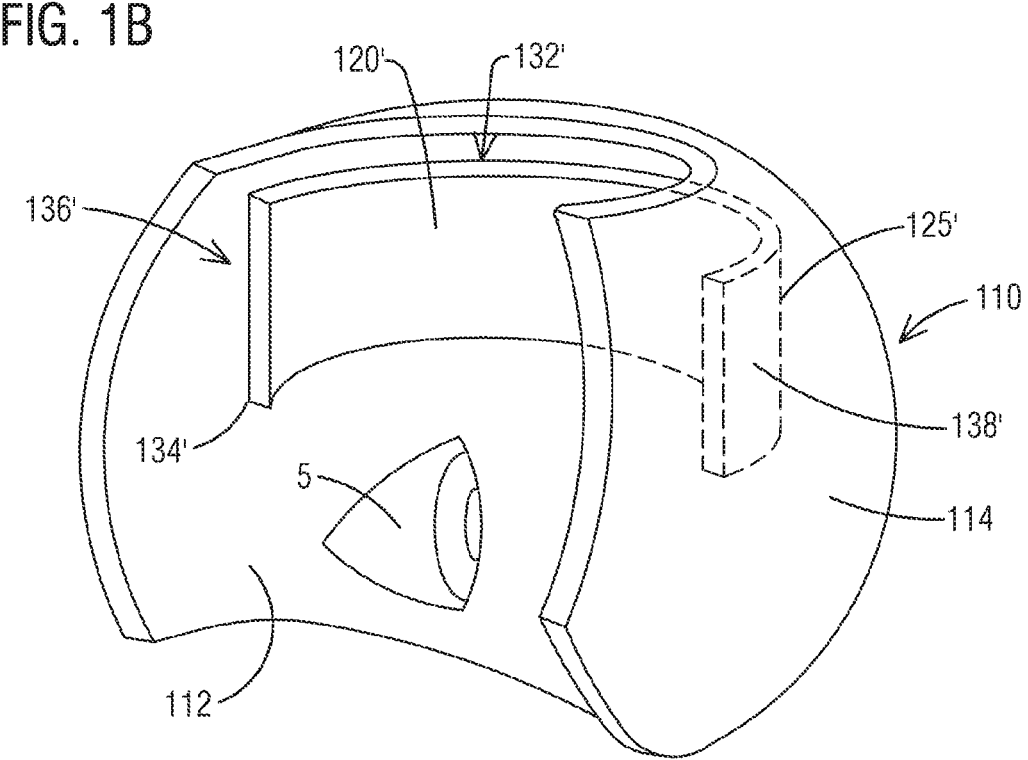
FIG. 1B illustrates a perspective view of another lens relative to a different convex display device for a head-mounted display (HMD) apparatus.
Figure 1C:
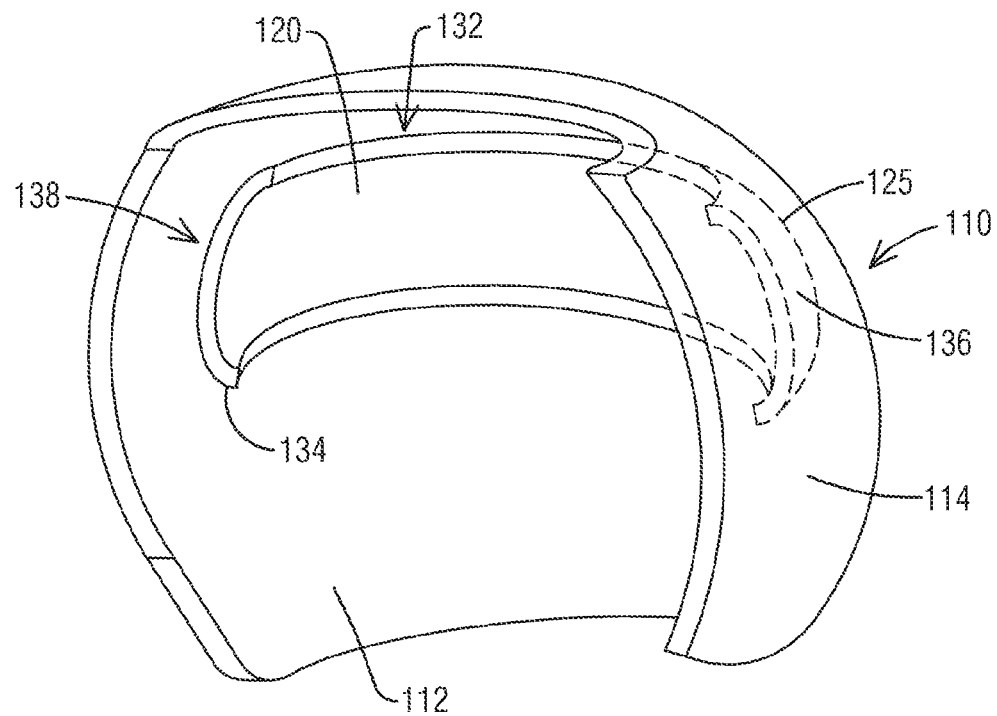
FIG. 1C illustrates a second perspective view of the lens relative to a convex display device for a head-mounted display (HMD) apparatus of FIG. 1A.

FIGS. 1A and 1C illustrate first and second perspective view of a lens 110 relative to a convex display device 120 for a head-mounted display (HMD) apparatus (FIGS. 2-3) relative to a wearer's eye 5. The first and second perspective views of FIGS. 1A and 1C are of opposite sides of the lens 110. The display device 120 may be a liquid crystal displays (LCD), light emitting diode (LED) displays, organic light emitting diode (OLED) displays, and flexible OLED displays. The display device 120 may be configured to be head-worn about the forehead, brow and temple of the wearer and above the field of view of the wearer's eyes. The display device 120 may be a head-word display device.

Figure 2:
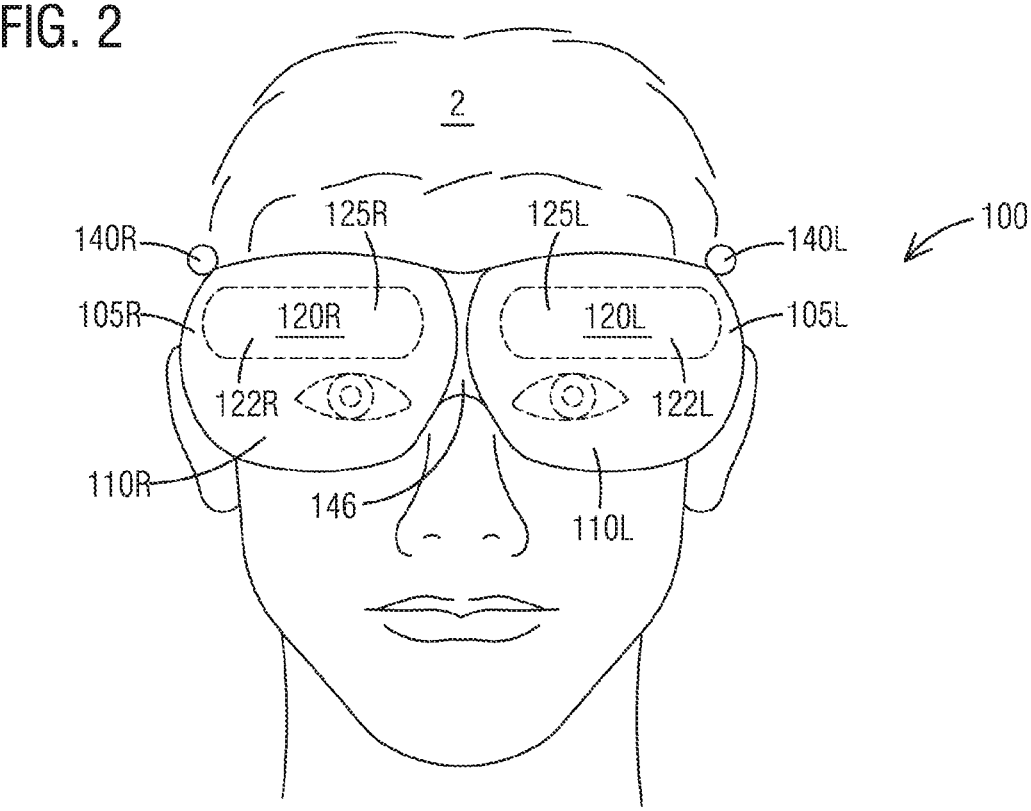
FIG. 2 illustrates a front view of a head-mounted display (HMD) apparatus worn on the head of a wearer.

In some embodiments, the display device 120 includes a front display area 125 including a top side 132, a bottom side 134, a left side 136 and a right side 138. The terms top side and bottom side are terms used to provide a frame of reference. The top side 132 is located above the bottom side 134 or above the front display area 125, as best seen in FIG. 2. The bottom side 134 is located below the top side 132 or below the front display area 125. The terms left side 136 and right side 138 also provide a frame of reference. With reference also to FIG. 5D, the top side 132 includes a maximum point 132M (FIG. 5D) from which the curvature of the display device essentially ends. The bottom side 134 includes a minimum point 134M (FIG. 5D) from which the curvature of the display device essentially ends.

Figure 11:
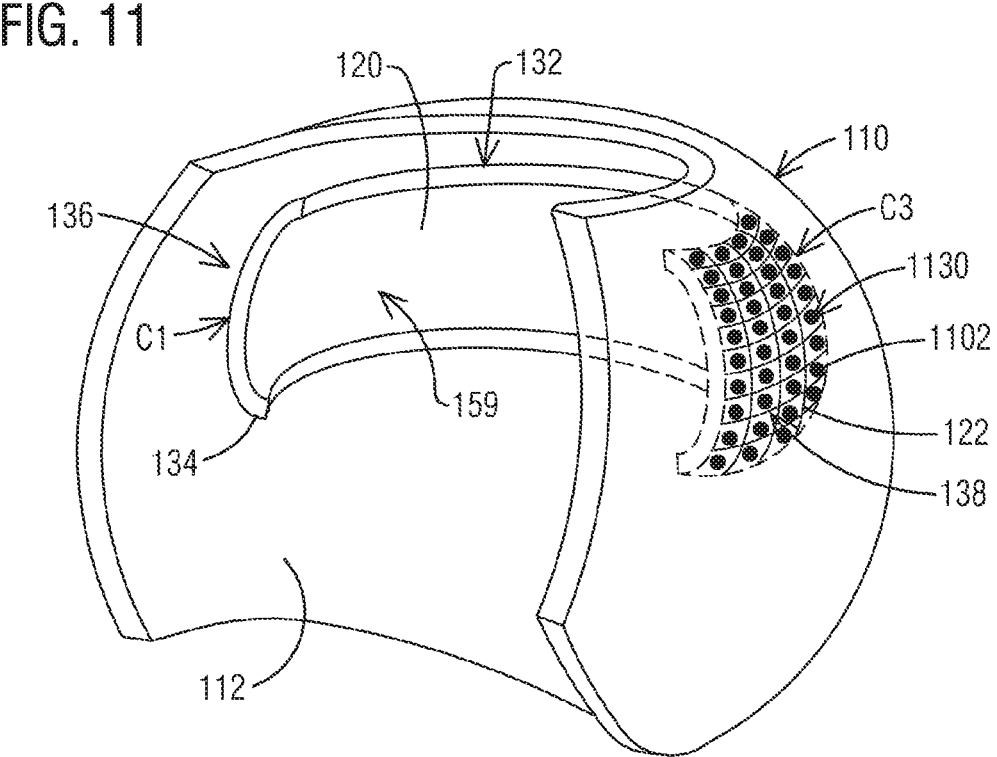
FIG. 11 illustrates a first perspective view of a lens relative to a convex display device for a head-mounted display (HMD) apparatus and with a pixel matrix and a set of pixel elements.
Figure 15:
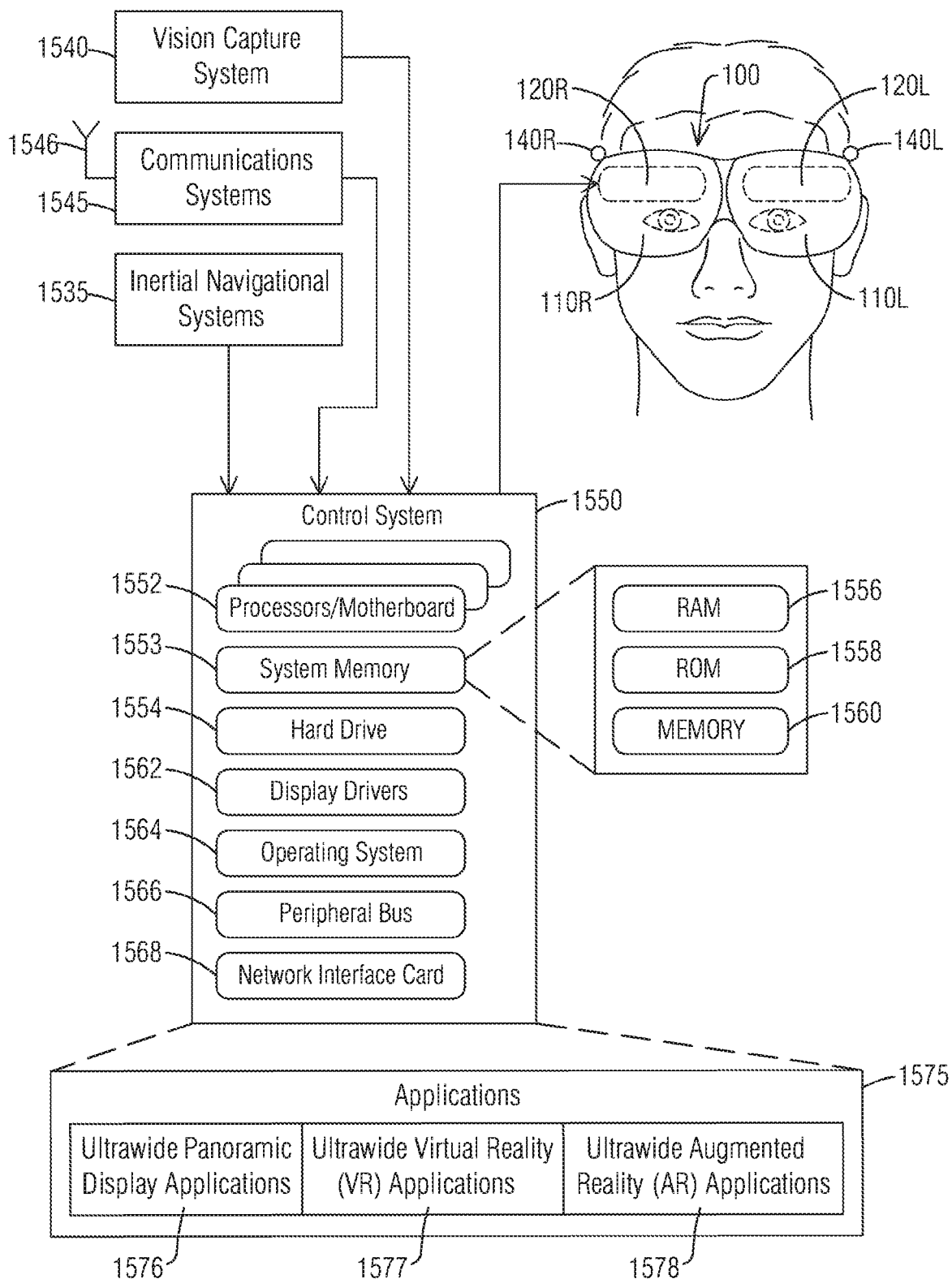
FIG. 15 illustrates block diagram of a head-mounted display (HMD) apparatus with a control system and other HMD architectural components.

Referring also to FIG. 11, a first perspective view of a lens relative to a convex display device for a head-mounted display (HMD) apparatus with a pixel matrix 1102 on a display substrate 159. The pixel matrix 1102 includes signal lines (not shown) for selectively controlling and addressing pixel elements by row and column using display drivers 1562 (FIG. 15). The curved display device 120 has a convex display screen 122 including a plurality of pixel elements, only a portion of the pixel elements of pixel matrix 1102 shown for illustrative purposes. The plurality of pixel elements may be non-coplanar horizontally and vertically on the convex display substrate 159. The term "pixel elements" as used herein refers to the electronic matrix of components, such as without limitation, light emitting diode (LED) components, to selectively address and control light to radiate or emanate from the location of the pixel element on a display substrate 159 outward for reflection from a reflective optical surface 112. The term "pixel" may also be used in relation to the display device 120 for a source of radiating light and will sometimes be referred to as "pixel element." The term "pixel" in relation to a reflective optical surface (i.e., lens 110) is a reflected pixel of light corresponding to a pixel element on the display device 120. The term "screen" may refer to the entire collection of pixel elements coupled to a substrate 159. The "screen" may include a glass or transparent cover over the pixel elements in some embodiments through which light emanates unencumbered toward the lens 110. In other embodiments, a glass or transparent cover may not be included.

Referring still to FIGS. 1A, 1C and 11, the lens 110 includes a reflective optical surface 112 on the interior of the lens 110. The display device 120 is configured to produce computer-generated content, data or imagery displayed by the convex display screen 122 for viewing by a wearer's eye 5 by reflection to the user's eye(s) via the reflective optical surface 112. The term computer-generated content, data or imagery may include one or more of virtual images, alphanumeric data, symbols, video, and other computer-generated content. The term computer-generated data, data, or imagery will sometimes hereinafter be referred to as "computer-generated content" (CGC). The term CGC may include all content displayed simultaneously and/or over time using at least one display device. In some instances, CGC may be displayed in only one display device because the registered locations for the CGC are only associated with the field of view for a single eye. In other instances, CGC may have registered locations which span the field of view for two eyes including up to the limits of the far peripheral vision fields for both eyes. The lens 110 may include an external surface 114 through which the wearer may see the real-world view.

In operation, CGC may include multiple types of CGC, such as images, data, alphanumeric data, symbols, and/or video, simultaneously wherein different types of CGC may be displayed at different registered locations in one or both display devices display devices 120R and 120L (FIG. 2).

Figure 1D:
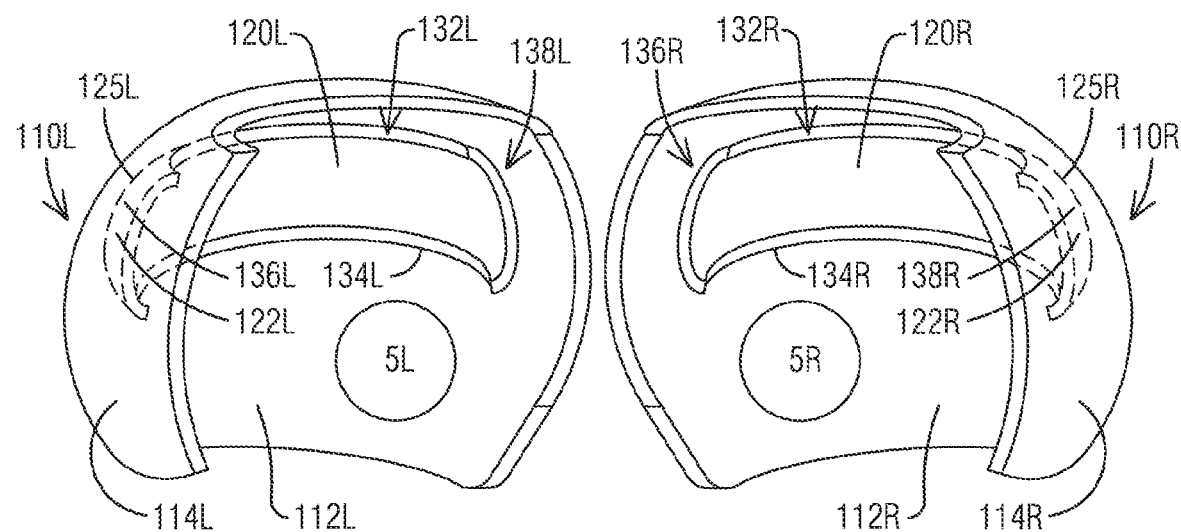
FIG. 1D illustrates a rear perspective view of a pair of lenses relative to a pair of convex display devices for a head-mounted display (HMD) apparatus.
Figure 4:
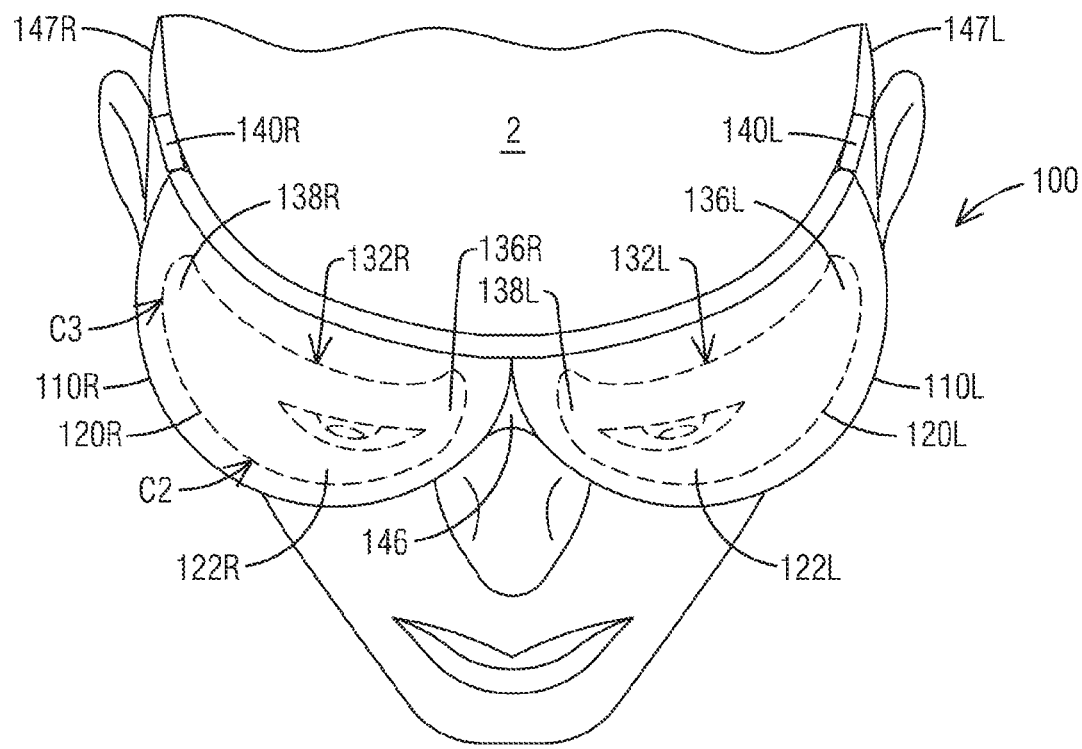
FIG. 4 illustrates a top perspective view of a head-mounted display (HMD) apparatus with a pair of lenses relative to a pair of convex display devices.

Referring now to FIGS. 1D, 2, and 4, a rear perspective view of a pair of lenses 110R and 110L relative to a pair of convex display devices 120R and 120L, respectively, for a head-mounted display (HMD) apparatus 100, a front perspective view, and a top perspective view of the head-mounted display (HMD) apparatus 100, are illustrated. The lens 110R is for a right eye (i.e., eye 5R). Then, the left side 136R of the curved display device 120R for the right eye 5R is a second side of the convex display screen 122R being curved in the horizontal dimension in a direction in close proximity toward the nose of the wearer and, in some embodiments the face of the wearer wherein the display screen 122R may, in some embodiments, track or partially track the curvature of the lens 110R. The curvature of the curved display devices 120R and 120L may have a convex curvature which wraps the display devices around the face or temple of the wearer while keeping the display devices close (close profile) to the temple and forehead of the wearer. As used herein, the "L" denotes left; the "R" denotes right; the "E" denotes ear; and the "N" denotes nasal or nose.

The right side 138R of the curved display device 120R for the right eye 5R is in proximity to the user's ear with the convex display screen 122R being curved in a direction toward the ear or head of the wearer wherein the display screen 122R may, in some embodiments, track or partially track the curvature of the lens 110R in the horizontal dimension. The first side and the second side for the curved display device 120R will be referred to the right ear proximal side and the right second side.

The lens 110L is for a left eye 5L. Then, the left side 136L of the curved display device 120L is a first side of the convex display screen 122L being curved in a direction toward the ear or head of the wearer wherein the display screen 122L may, in some embodiments, track or partially track the curvature of the lens 110L.

The right side 138L of the curved display device 120L for the left eye 5L is a second side of the convex display screen 122L being curved in a direction toward the nose of the wearer and, in some embodiments, the face of the wearer wherein the display screen 122L may, in some embodiments, track or partially track the curvature of the lens 110L. The first side and the second side for the curved display device 120L will be referred to the left first side and the left second side.

Each of these sides 136L, 136R, 138L and 138R may terminate the convex curvature in the horizontal dimension. Additionally, top sides 132R and 132L of display devices 120R and 120L, respectively, may have a different convex curvature than the curvature of the bottom sides 134R and 134L, respectively. The sides 132L and 134L of display device 120L may each have a different convex curvature in the horizontal dimension. The sides 132R and 134R of display device 120R may each have a different convex curvature in the horizontal dimension.

First convex curvature area C1 is generally shown as having one curvature from the top side to bottom side in the vertical direction, for illustrative purposes only. The second convex curvature area C2 is generally shown as having one curvature from a left side to a right side in the horizontal direction, for illustrative purposes only. The second convex curvature area C2 includes a third convex curvature area C3 configured to wrap the convex display device around a temple of the wearer. As can be appreciated, the third convex curvature area C3 overlaps with the second convex curvature area C2 and the first convex curvature area C1. Likewise, the second convex curvature area C2 overlaps with the first convex curvature area C1.

In some embodiments of the lens 110R and lens 110L, the curvature of the lens 110R and 110L changes continuously from point-to-point in a generally concave geometric profile. In other words, the curvature at the reflection point of a respective one pixel element on a lens may be different or changed from curvatures with respect to reflection points of other pixel elements on the lens. Each pixel element is paired with a single surface location on the reflective optical surface 112 for a one-to-one correspondence. Thus, the convex curvature of the substrate 159 of each display device 120R and 120L may also continuously change across the surface of the substrate 159, both in the vertical direction, as well as, in the horizontal direction in a generally convex geometric profile so that the pixel elements are co-planar. Therefore, in some embodiments, the term "first convex curvature area C1" refers to the overall convex curvature (although continuously changing smoothly) from the top side to bottom side in the vertical direction of the convex curvature of the substrate 159. In some embodiments, the term "second convex curvature area C2" refers to the overall convex curvature (although continuously changing smoothly) from the left side to the right side in the horizontal direction of the convex curvature of the substrate 159. In some embodiments, term "third convex curvature area C3" also refers to the overall convex curvature although continuously changing.

The description "continuously changing smoothly" is not meant to imply that such changes occur in real-time. In the design of a respective one optical system, locations of pixel elements of the convex display device are paired with locations on the reflective optical surface, such that when the optical system is worn by the wearer both the convex display device and lens remain in fixed relation and with a fixed geometric profile.

The reflector (reflective optical surface) of a lens has an infinite number of curvatures smoothly changing across the reflector's surface because the optical characteristics require different curvatures and orientations at different points of reflection, with the infinite number of curvatures being limited by the dimensions of the lens structure/shape. In some embodiments, the display screen or substrate 159 may also have an infinite number of curvatures limited by the dimensions of the structure/shape of the substrate 159. The substrate 159 or convex display device will have an overall shape set by the form of the user's head or a form created to fit a general population of head shapes. Then the resulting curvature will be adjusted across the display device, as allowed by the technology. There may be areas where the curvature is changing smoothly across the surface of the display screen, resulting in an infinite number of curvatures along the substrate 159, since a curvature of substrate 159 is measured at a point, and may be different from one point to the next point.

The first convex curvature C1 (FIG. 11) may continuously change from the top side 132R to the bottom side 134R, and through the front display area 125R of display screen 122R (FIG. 2) to radiate light representative of displayed CGC. The CGC is reflected from a reflective optical surface 112R for viewing by the right eye in a predetermined human vertical field of view and, in some embodiments, up to the full human vertical field of view including the upper and lower limits of the human vision fields, vertically, according to the limits of right eye. The first convex curvature C1 (FIG. 11) may continuously change from the top side 132L to the convex curvature of the bottom side 134L of the display screen 122L (FIG. 2) to radiate light representative of displayed CGC. The CGC is reflective from a reflective optical surface 112L for viewing in a predetermined human vertical field of view and, in some embodiments, up to the full human vertical field of view including the upper and lower limits of the human vision fields, vertically, according to the limits of the left eye. Thus, collectively, the convex curvatures C1 (FIG. 11) of each of the display screens 122R and 122L may allow displayed CGC to be reflected by the reflective optical surface to the wearer's eye for viewing up to the upper vertical limit of the human vertical field of view, in some embodiments. Furthermore, collectively, the first convex curvature C1 (FIG. 11) of each of the display screens 122R and 122L may allow displayed CGC to be reflected to the wearer's eye from the reflective optical surface for viewing down to the lower vertical limit of the display, in some embodiments. In some embodiments, the real-world view is simultaneously seen through the external surfaces 114R and 114L, respectively, of the lens 110R and 110L while displayed CGC is reflected to the wearer's eyes via lenses 110R and 110L. The first convex curvature C1 may sometimes be referred to as a vertical convex curvature.

In some embodiments, the CGC is adapted to be reflected from a reflective optical surface of the HMD apparatus 100 in a direction to a single eye with the reflective optical surface being configured to reflect the CGC anywhere in the full human field of views for the eye, such as the full horizontal human field of view and the full vertical human field of view of the eye. In other embodiments, the CGC is adapted to be reflected from a reflective optical surface of the HMD apparatus 100 in the direction to a single eye with the reflective optical surface being configured to reflect the CGC in the full vertical human field of view for the eye but limited to reflect the CGC in a field of view which is less than the full horizontal human field of view for the eye. In still further embodiments, the CGC is adapted to be reflected from a reflective optical surface of the HMD apparatus 100 in a direction of a single eye with the reflective optical surface being configured to reflect the CGC in the full horizontal human field of view for the eye but limited to reflect the CGC in a field of view which is less than the full vertical human field of view for the eye. In still further embodiments, the CGC is adapted to be reflected from a reflective optical surface of the HMD apparatus 100 for a single eye with the reflective optical surface being configured for reflection in predetermined and limited vertical and horizontal field of views for a single eye. The predetermined and limited vertical and horizontal human field of views for a single eye may encompass vertical and horizontal field of views which are designed to limit the reflection of the CGC from the reflective optical surface in field of views which are less than both the full horizontal human field of view and the full vertical human field of view. For example, the predetermined human vertical field of view may include up to the upper vertical limit, in some embodiments, or less than the upper vertical limit, in other embodiments. The predetermined human vertical field of view may also include down to the lower vertical limit, in some embodiments, or less than the lower vertical limit, in other embodiments.

The second convex curvature C2 (FIG. 4) of display screen 122R terminating at side 136R and side 138R also extends through the front display area 125R and the third convex curvature C3 of display screen 122R to radiate light representative of displayed CGC, which is then subsequently reflected to the wearer's eye, to appear by reflection for viewing in the human horizontal field of view and up to the full human horizontal field of view, in some embodiments, including the outer limit of the human peripheral vision field, horizontally, relative to the right eye. The convex curvature C2 of the display screen 122L terminating at side 136L and at side 138L also extends through the front display area 125L of display screen 122L to produce light representative of displayed CGC, which is then subsequently reflected to the wearer's eye, to appear by reflection for viewing in the human horizontal field of view and up to the full human horizontal field of view, in some embodiments, including the outer limits of the far peripheral vision fields of the full human vision field, horizontally, relative to the left eye. The second convex curvature C2 may sometimes be referred to as a horizontal convex curvature.

Figure 5A:
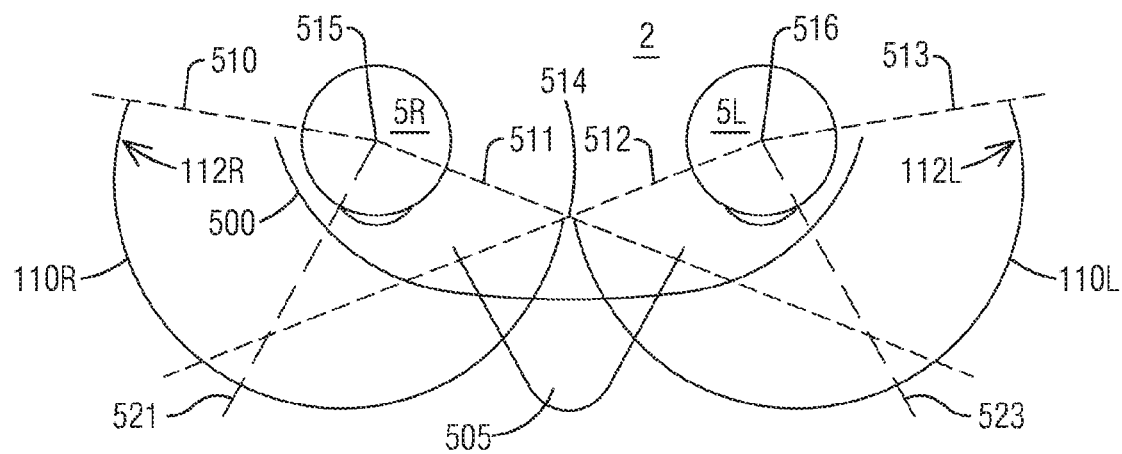
FIG. 5A illustrates a top view of two curved reflective optical surfaces relative to two eyes of the wearer.
Figure 5B:
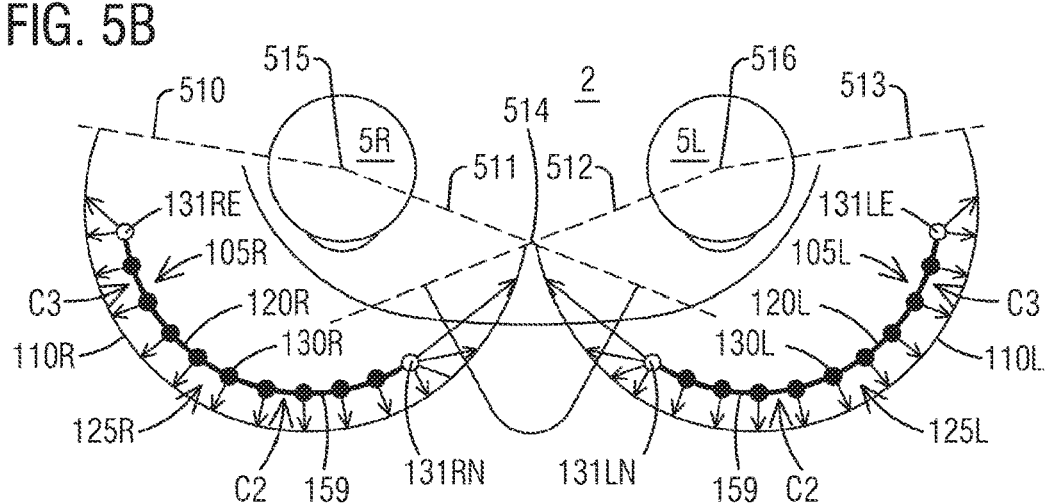
FIG. 5B illustrates a top view of two optical systems relative to two eyes of the wearer.
Figure 5C:
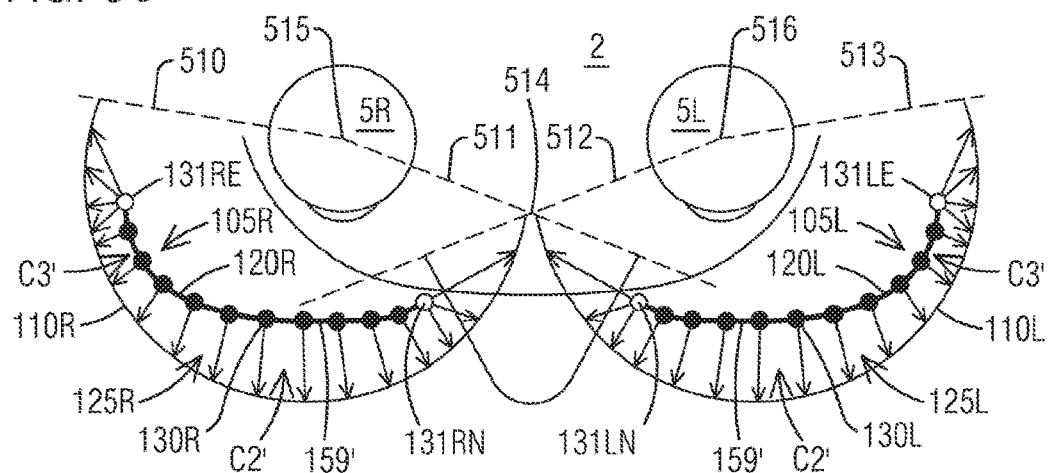
FIG. 5C illustrates a top view of two optical systems relative to two eyes of the wearer with a less rounded display configuration.
Figure 5D:
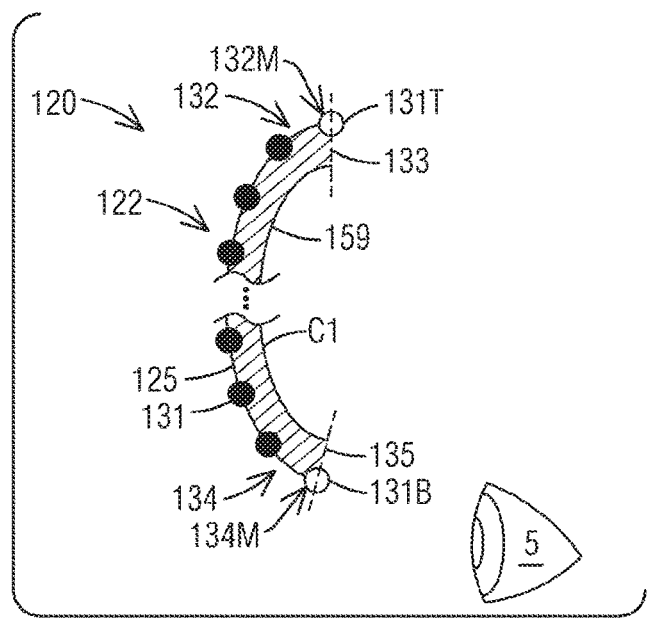
FIG. 5D illustrates a partial side cross-sectional view of a portion of the convex display device according to some embodiments.

Thus, collectively, the second convex curvature C2 of the display screen 122R from the right first side (i.e., side 138R) to the right second side (i.e., side 136R), and the second convex curvature C2 of the display screen 122L (FIG. 1D) from the left first side (i.e., side 136L) to the left second side (i.e., side 138L) may allow radiated light representative of displayed CGC to be reflected from selected locations on a reflective optical surface to the wearer's eye to appear by reflection for viewing in the full human horizontal vision field including the full peripheral vision to the right and left of the wearer's eyes relative to the selected locations, as will be described in more detail later in relation to FIGS. 5A-5C.

FIG. 1B illustrates a perspective view of lens 110 relative to a different convex display device 120' for a head-mounted display (HMD) apparatus. In the embodiment of FIG. 1B, the convex curvature (i.e., first convex curvature C1 in FIG. 11) in the vertical direction has been modified. The lens 110 may include an external surface 114 through which the wearer may see the real-world view and a reflective optical surface 112.

The convex display device 120' has a convex curvature in a horizontal dimension to curve the display device 120' about the temple of the wearer. As previously described, the convex curvature along the horizontal direction may be continuously changing. However, the overall curvature of all changes produces a generally convex curvature in the horizontal dimension. The convex display device 120', in the vertical dimension, may have a generally linear, straight, or sloped profile. The front display area 125' of the convex display device 120' has a convex curvature in one dimension, such as the horizontal dimension. The front display area 125' illuminates light in the direction of the reflective optical surface 112 for reflection to the user's eye 5. The convex curvature extends from a left side 136' which may be in proximity to the nose of a wearer. Furthermore, the convex curvature extends to a right side 138' which wraps around the temple of user and may extend to a location in proximity or near proximity to the wearer's ear.

The top side 132' of the convex display device 120' is generally not curved in a direction toward the user's face or forehead. However, to some extent, there may be some slight curving at the top side 132'. The bottom side 134' of the convex display device 120' is generally not curved in a direction toward the user's face. However, to some extent, there may be some slight curving at the bottom side 134'. In still further embodiments, one of the top side 132' and the bottom side 134' may be have a convex curvature, such as described above in relation to top side 132 and bottom side 134 of FIG. 1A.

Figure 3:
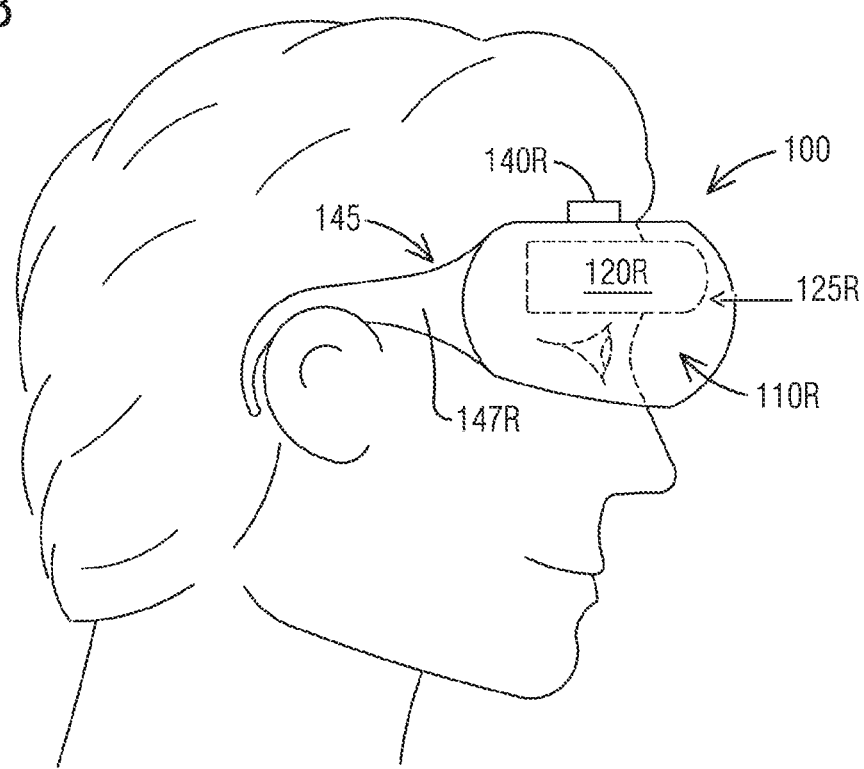
FIG. 3 illustrates a side view of a head-mounted display (HMD) apparatus worn on the head of the wearer.

Referring to FIGS. 2-3, front and side views of a head-mounted display (HMD) apparatus 100 worn on the head 2 of a wearer. The head-mounted display (HMD) apparatus 100 includes a frame 145 configured to be supported by the wearer's nose and ears in a manner similar to that in which eyeglasses are worn. The frame 145 is configured to support the lens 110R and 110L and a pair of convex display devices 120R and 120L, respectively. The frame 145 includes a nose bridge 146 which is configured to support the sides of the lens 110R and 110L and the HMD apparatus 100.

In reference to FIGS. 1D and 2, the lens 110R with a reflective optical surface 112R (FIG. 1D) and the curved display device 120R together form a first optical system 105R. The lens 110L with a reflective optical surface 112L (FIG. 1D) and the curved display device 120L together form a second optical system 105L. The first optical system 105R and the second optical system 105L together may be configured to superimpose displayed CGC in the real-world view for viewing through reflection from selected locations to appear anywhere in the full human vertical field of view and the full human horizontal field of view relative to the selected locations. The terms first and second as used herein are used as a frame of reference. In some instances, first and second may be right (R) and left (L). The superimposed CGC on the reflective optical surfaces may include, from at least one of the display device 120R and the display device 120L, radiated light representative of an image for reflection from the reflective optical surface to create an image which spans the entire vertical and horizontal fields of view. The superimposed CGC may be reflected from one or more selected locations, such as to create virtual reality (VR) elements in the real-world view seen through the reflective optical surfaces.

In some embodiments, the HMD apparatus 100 may include at least one of the first optical system 105R and the second optical system 105L. However, use of only one of the optical systems 105R or 105L limits the reflection area to the field of view up to the full human field of view of a single eye.

In the embodiment of FIGS. 2-3, as well as in the other embodiments disclosed herein, the frames 145 of the HMD apparatus 100 and the optical systems 105R and 105L may have a variety of configurations and can, for example, resemble conventional goggles, glasses, helmets, and the like. In some embodiments, a strap (not shown) may be used to hold the frame 145 in a fixed position with respect to the eyes of the wearer. The frame 145 of the HMD apparatus 100 can assume any form that holds the first and second optical systems 105R and 105L in the required orientation with respect to the HMD's display(s) and the wearer's eyes. The optical systems may include other components as will be described later in relation to FIG. 15 such as drivers and buffers for the display devices 120R and 120L. The frame 145 includes temple arms, only one arm 147R is shown in FIG. 3.

In some embodiments, the reflective optical surfaces 112R and 112L as shown in FIG. 1D, of each lens 110R and 110L, may be a free space, ultra-wide angle, reflective optical surface which is curved as described in U.S. Pat. No. 8,781,794, titled "METHOD AND SYSTEM FOR CREATING FREE SPACE REFLECTIVE OPTICAL SURFACES," by Gregory A. Harrison et al., incorporated herein by reference as if set forth in full below. Reflective optical surfaces 112R and 112L may be purely reflective or can have both reflective and transmissive properties, in which case, it can be thought of as a type of "beam splitter."

Lens 110L and 110R may be created through the calculation of each oxel in the reflective (lens) optical surfaces 112R and 112L controlled by or as a function of the location of the pixel or pixel element, for reflection to the wearer's eye, on a corresponding reflective optical surface and where the corresponding pixel element is placed on and displayed by the convex substrate of the convex display device. Such lens may be created based on oxel calculations such as described in U.S. Pat. No. 9,454,007, titled "FREE-SPACE LENS DESIGN AND LENSES THEREFROM," by Smith et al., incorporated herein by reference as if set forth in full below. The oxel location may also be determined by the distance from the eye that the lens is, and the field of view dimensions of the lens.

Each oxel has a plurality of sub-elements including a center sub-element and a plurality of neighboring sub-elements formed in the lens' reflective surface design. Based on a defined optical prescription for the inside reflective optical surface (i.e., reflective optical surface 112 of FIG. 1A), an optically corrected reference three-dimensional (3D) surface is calculated for each oxel having spherical and cylindrical corrections relative to a spherical contour, which spans a predetermined field of view (FOV) with respect to a single (common) predetermined reference point. Each oxel of the first reflective optical surface may also be determined by a location of each pixel element of the first display device. Likewise, each oxel of the second reflective optical surface is determined by a location of each pixel element of the second display device.

To an extent, the oxel is determined by the pixel element's location on the convex display device. Furthermore, some aspects of the oxel are determined by the pixel element's location, such as the direction that the oxel points, but other parameters help to control the oxel including the desired field of view, and the distance from the eye. Some embodiments may seek to maximize the available reflected power by also adjusting the direction that the pixel element points so that more of its available emitted energy can be reflected by its associated oxel.

In one embodiment, the frame 145 is configured to support the display devices 120R and 120L at a fixed location relative to the reflective optical surfaces 112R and 112L at a location which is outside of the wearer's field of view.

The reflective optical surfaces 112R and 112L may surround one or both eyes. In particular, the reflective optical surfaces may be configured to curve around the sides of the eyes and toward the sides of the face so as to expand the surface area of the reflective optical surfaces to extend across the entire or full human horizontal field of view including the full extent of the human peripheral vision field, in some embodiments. Specifically, the right reflective optical surface 112R extends around the right temple and right side of the face to cover the full extent of a human's right peripheral vision field. Furthermore, the left reflective optical surface 112L extends around the left temple and left side of the face to cover the full extent of a human's left peripheral vision field.

The right reflective optical surface 112R extends above and below the right eye to cover the full extent of a human's vertical field of view or vision field of the right eye. Furthermore, the left reflective optical surface 112L extends above and below the left eye to cover the full extent of a human's vertical field of view or vision field of the left eye.

In one embodiment, the reflective optical surfaces 112R and 112L may extend up to 180°, 190° or more (e.g., more than 200°), as best seen in FIGS. 5A and 5B as will be discussed later. The horizontal field of view is sometimes referred to as being in the range of 190°-200°. Therefore, the reflective optical surfaces 112R and 112L may extend slightly greater than 190° or slightly greater than 200°. For example, the reflective optical surfaces 112R and 112L may be slightly greater than the human horizontal field of view in the range of 190°-200° by +1°-5°, by way of non-limiting example.

As illustrated in FIGS. 2 and 4, the two separate reflective optical surfaces 112R and 112L (FIG. 1D) for the wearer's two eyes may be separately supported by the frame including the temple arms 147R and 147L and/or the nose bridge 146. The frame 145 also may support a vision system including at least one camera 140R and 140L or other imaging device. The cameras 140R and 140L may be at least one of a red, green, blue (RGB) imaging device, a night vision camera and an infrared imaging device including a near infrared camera (NIR), visible and near infrared camera (VNIR) and infrared imaging devices. The type of camera may be a function of the application for which the HMD apparatus 100 will be used.

With specific reference to FIG. 4, the display screen 122R of the convex display device 120R, associated with the right eye, may have a first convex curvature C1 along the vertical dimension, as best seen in FIGS. 5D and 11, along a longitudinal length of the display screen 122R. The display screen 122R, associated with the right eye, may have a second convex curvature C2 in the horizontal dimension as best seen in FIGS. 5B and 5C along the longitudinal length of the display screen 122R. The longitudinal length corresponds to a length from right to left or left to right. Furthermore, the display screen 122R may have a third convex curvature C3 in the horizontal dimension configured to be positioned at an area in front of the temple to smoothly curve around a right side of the face of the wearer. The second convex curvature C2 includes the third convex curvature C3 along the longitudinal length of the display screen 122R. The display screen 122R, associated with the right eye, of the display device 120R may be curved around the temple following the third convex curvature C3 where the longitudinal length of the display screen 122R includes a length which extends along the side of the face toward the proximity of the ear. The display screen 122R terminates at a distal end in proximity to the ear to direct the emanating light from the screen to the far peripheral vision field associated with the eye for reflection. The second curvature C2 of the display screen, associated with the eye, along the longitudinal length, transitions and terminates at a second distal end of the display screen 122R to direct the emanating light from the screen to the field of view associated with the mid peripheral vision field of an adjacent eye or the second side. In some embodiments, the third convex curvature C3 may have a rounded right angle to smoothly transition a length of the display screen 122R having the first convex curvature C1 of the display screen around the right temple or right side of head of the wearer. Likewise, the display device 120L includes convex curvature C1 in the vertical dimension, convex curvature C2 in the horizontal dimension and a third convex curvature C3 form in the curvature C2 as described above in relation to display device 120R. The term "proximity" is used interchangeably herein with "near proximity." The lens 110 described herein does not require to be extended directly in front of and parallel to the ear but may stop short of the ear.

FIGS. 5A-5F will be described together. FIGS. 5A-5F also relate to FIGS. 1D, 2 and 4. FIG. 5A illustrates a top view of two curved reflective optical surfaces 112R and 112L relative to two eyes 5R and 5L of the wearer. The two curved reflective optical surfaces 112R and 112L relative to two eyes 5R and 5L of the wearer are shown in front of the wearer's eyes. FIG. 5B illustrates a top view of two optical systems 105R and 105L relative to two eyes 5R and 5L of the wearer. The two optical systems 105R and 105L relative to two eyes 5R and 5L are shown with the display devices 120R and 120L, respectively, above the eyes of the wearer so that the display devices are generally out of the field of view of the wearer's eyes. The two optical systems 105R and 105L may further include lenses 110R and 110L associated with the eyes 5R and 5L. FIG. 5B is illustrative of the optical systems 105R and 105L illuminating light representative of CGC which can be reflected to the wearer's eye to appear by reflection for viewing anywhere within and up to the full human horizontal field of view.

Specifically, in the embodiment illustrated in FIGS. 5A and 5B, the eye is able to take in a viewing area represented in FIGS. 5A and 5B by curved reflective optical surfaces 112R and 112L (shown in FIG. 5A), corresponding to at least 150 degrees of horizontal field of view (FOV) for each eye (e.g., ~168 degrees of horizontal FOV). This field of view is composed of the eye's foveal field of view and its peripheral field of view. In addition, the eye is allowed to move freely about its center of rotation to aim the combined foveal+peripheral field of view in different directions of gaze, as the eye naturally does when viewing the physical (real) world. The optical systems in some embodiments may allow the eye to obtain information throughout a range of motion in the same manner as the eye does when viewing the real world.

FIGS. 5A and 5B illustrate the reflective optical surfaces 112R and 112L (shown in FIG. 5A) placed in front of the wearer's eyes 5R and 5L, respectively. The reflective optical surfaces 112R and 112L (shown in FIG. 5A) may come together at the center front 514 of the wearer's head 2 or nose 505. As discussed in detail below, the local normals and local spatial locations of surfaces 112R and 112L (shown in FIG. 5A) are adjusted so that radiated light of images produced by the pair of convex display devices 120R and 120L (shown in FIG. 5B) can be reflected to the wearer's eye to cover up to 200° of the full human horizontal FOV, such as when the wearer rotates their eyes between the left far peripheral field and the right far peripheral field. For example, the local normals and local spatial locations can be adjusted to cover the wearer's complete ~168 degree, straight ahead, horizontal, static field of view for each eye, with the 168 degrees extending from edge-to-edge of the reflective optical surfaces 112R or 112L (shown in FIG. 5A), as shown by sight lines 510, 511 and 512, 513. The sight lines correspond to the wide field of view (foveal+peripheral) that is provided to the wearer. In addition, the wearer is free to move his/her eyes around rolling centers 515 and 516 while continuing to see computer-generated data or imagery, such as described in U.S. Pat. No. 8,625,200, titled "HEAD-MOUNTED DISPLAY APPARATUS EMPLOYING ONE OR MORE REFLECTIVE OPTICAL SURFACE," by David A. Smith et al., incorporated herein by reference as if set forth in full below. The sight line 510 corresponds generally to the right far peripheral field of view. The sight line 513 corresponds generally to the left far peripheral field of view.

The peripheral vision field includes a right near peripheral vision field beginning at about line 521 and a left near peripheral vision field beginning at about line 523 adjacent to the paracentral vision field. The vision field of the wearer may include the paracentral vision field, a central focal vision at approximately 1.5°-3° and the peripheral vision field. The central focal vision in some instances may include approximately 5° looking straight ahead. The paracentral vision field may include about 8°. The right near peripheral vision field and the left near peripheral vision fields are adjacent to and on each side of the paracentral vision field.

The peripheral vision field may include a right mid peripheral vision field generally adjacent to the right near peripheral vision field and a left mid peripheral vision field generally adjacent to the left near peripheral vision field. Generally, the right eye can see the reflected CGC and/or the real-world view in the right mid peripheral vision field, the right near peripheral vision field, the paracentral vision field, the central focal vision, the left near peripheral vision field and the left mid peripheral vision field through the lens 110R. Generally, the left eye can see the reflected CGC and/or the real-world view in the left mid peripheral vision field, the left near peripheral vision field, the paracentral vision field, the central focal vision, the right near peripheral vision field and the right mid peripheral vision field through of the lens 110L.

The peripheral vision field may include a right far peripheral field and a left far peripheral field. Generally, only the right eye can see in the entire field of the right far peripheral field. The left eye can only see in the entire field of the left far peripheral field. As seen in FIG. 5A, the sight line 511 of the right eye 5R extends into the peripheral vision field of the left eye 5L. Furthermore, the sight line 512 of the left eye 5L extends into the peripheral vision field of the right eye 5R.

In FIG. 5B, the optical system 105R includes a convex display device 120R having a plurality of pixel elements 130R which are arranged along the substrate 159 of the display device 120R. The convex curvature of the display device 120R may vary along a top side, a bottom side, the left side, the right side and a front display area.

In some embodiments, the convex curvature of each side and/or distal end extends the display field of each display device through reflection to the wearer's eye to appear for viewing anywhere up to the full human field of view both horizontally and vertically. In some embodiments, the display device itself may have a convex curvature which is smaller than the full human field of view for a single eye but radiates light which is subsequently reflected from a reflective optical surface to cause the displayed content to appear in the full human field of view for the single eye according to the pixel locations of reflection. The right side and left side of the second convex curvature C2 of the right display device and the left display device, respectively, may extend the area of illumination of the display devices to include the full human horizontal field of view up to 200° by directing the radiated light beyond the surfaces of the display screen to the reflective optical surface located for example, in the peripheral vision fields, for reflection toward the wearer's eye. Such reflection appears in the same peripheral vision field. In some embodiments, each pixel element may be correlated to a particular surface location of reflection on the reflective optical surface to extend the distance for which the display device may display alone including the limits of the full human vision field. The location on the reflection optical surface is selected to provide a predetermined brightness intensity. In some embodiments, the second convex curvatures C2 of each display device may terminate prior to the location of which the outer limit of the full human horizontal field ends. The second convex curvature C2 of each display screen may allow a smaller display screen to reach the outer limits of the full human horizontal field through the reflection of offset rays.

For example, the right side of a right mounted display device 120R includes a distal end, in proximity to the right ear of a wearer, having a curvature which extends the area of illumination of the display device 120R to the reflective optical surface for reflection in a right eye's peripheral limit of the full human horizontal field of view. The corresponding pixel elements 131RE of the plurality of pixel elements 130R may be configured to produce or radiate light propagated in a direction to intersect with the reflective optical surface 112R at a location which extends past the distal end of the display device 120R in proximity to the right ear. The left side of a left mounted display device 120L includes a distal end, in proximity to the left ear of a wearer, which has a curvature which extends the distance of illumination of the display device 120L to the reflective optical surface for reflection in a left eye's peripheral limit which could be of the full human horizontal field of view. The corresponding pixel elements 131LE of the plurality of pixel elements 130L may be configured to produce or radiate light propagated in a direction to intersect with the reflective optical surface 112L at a location which extends past the distal end of the display device 120L, in proximity to the left ear.

The pixel elements 131RE may radiate or illuminate light rearward of the right eye a direction which is up to the limit of or 100% of the human horizontal field of view on the right side. The pixel elements 131LE may radiate or illuminate light rearward of the left eye in a direction which is up to the limit of or 100% of the human horizontal field of view on the left side.

The reflective optical surface 112R at the right side 138R (FIG. 1D) receives radiated light and reflects the radiated light to the wearer's right eye 5R. The second convex curvature C2 to the right side 138R (FIG. 1D) is configured to direct light for reflection to the wearer's eyes for appearance that can extend, in some embodiments, up to the full extent of the human right peripheral vision. In FIG. 5B, for illustrative purposes only, assume pixel elements 131RE, denoted as a circle, of the plurality of pixel elements 130R, denoted as black dots, may be aligned with other pixel elements in a column. The plurality of pixel elements 130R may also include pixel elements 131RE in proximity to the ear and pixel elements 131RN in proximity to the nose. The pixel elements 131RE and pixel elements 131RN may be arranged in a column along the first convex curvature C1. The vertical field of view will be described in relation to FIGS. 11 and 12. The curvature vertically and horizontally may also wrap the substrate 159 around the temple or head of the wearer, while continuously changing the first convex curvature C1 in the vertical dimension between the top side (FIG. 5D) and the bottom side (FIG. 5D). This curvature C1 is generally continuously changing as the substrate 159 curves about the temples at third convex curvature C3 to extend the length of the display devices to the location of the pixel elements 131RE relative to lens 110R, so that their illumination or radiating light will intersect the reflective optical surface 112R; and thus, covering the far peripheral vision area of the right eye 512. In some embodiments, the third convex curvature C3 around the temple may smoothly transition in a rounded right-angle profile while the first convex curvature C1 also smoothly transitions as the curvature continuously changes between the top side (FIG. 5D) and the bottom side (FIG. 5D). The smooth transition may be a rounded angle in some embodiments to wrap the display around the temple of the forehead and extend the substrate 159 in a direction of the ear.

The pixel elements 131RN, denoted as a circle, may be positioned on a curved portion (i.e., second convex curvature C2) of the display screen 122R (FIG. 2) which smoothly transitions vertically and horizontally, while also smoothly transitioning (continuously changing) the first convex curvature C1 in the vertical dimension between the top side 132 (FIG. 5D) and the bottom side 134 (FIG. 5D). The curved portion curves in the direction toward the nose of the wearer and, in some embodiments, toward the face of the wearer.

The first convex curvature C1 between the top side 132 (FIG. 5D) and the bottom side 134 (FIG. 5D) smoothly transitions to allow light from the display device to radiate light in a direction beyond a side of the display device to extend the reflected illumination area in the direction of the line denoted as sight line 511. This curvature curves the location of the pixel elements 131RN so that its illumination will intersect the reflective optical surface 112R corresponding to the right eye's overlapping field of view covering part of the left (opposite) eye's peripheral vision field. The sight line 511 generally extends from the rolling center of the right eye toward the nose of a wearer.

Turning now to the left mounted display device 120L, assume pixel element 131LE, denoted as a circle, of the plurality of pixel elements 130L, denoted as black dots, may be aligned with other pixels in a column. The plurality of pixel elements 130L may also include pixel elements 131LE and pixel elements 131LN arranged in a column of pixel elements along the first convex curvature C1. The vertical field of view will be described in relation to FIG. 12. The pixel elements 131LE are positioned on a curved portion of the display screen 122L (FIG. 1D) which is curved about third curvature C3 in the direction of the temple or head of the wearer. This curvature C3 curves the substrate 159 to the location of the pixel elements 131LE so that the pixel's illumination of radiating light will intersect the reflective optical surface 112L covering the far peripheral vision area of the left eye 5L. The pixel elements 131LN is positioned on a curved portion of the display screen 122L (FIG. 1D) wherein the second convex curvature C2 is curved in the direction of the nose of the wearer and, in some embodiments, back toward the face of the wearer. This convex curvature C2 curves, in the horizontal dimension, the location of the substrate 159 for placement of the pixel elements 131LN relative to (left) lens 110L. Thus, the pixels' illumination of light will intersect the reflective optical surface 112L and thus, overlapping the right eye's vision field in that portion of the opposite (right) eye's peripheral vision field along the line denoted as sight line 512. The sight line 512 generally extends from the rolling center of the left eye toward the nose of a wearer.

The distance between the plurality of pixel elements 130R and 130L on the convex display screens 122R and 122L (FIG. 1D) respectively will be measured according to a non-Euclidean plane, a curved plane, as best seen in FIG. 11. In some embodiments, the pixel elements are equidistant.

FIG. 5C illustrates a top view of two optical systems relative to two eyes of the wearer with a less rounded display configuration. FIG. 5C is similar to FIG. 5B. Therefore, only the differences will be described in detail. In FIG. 5C, the substrate 159' in the horizontal direction (longitudinal length) is less curved in the horizontal dimension along that portion of the substrate 159' along the forehead above the eye associated with the display device. As can be seen, the substrates 159 and 159' have a smooth convex curvature in a horizontal dimension, which curve around the temples about the third convex curvature C3 and C3', respectively. As seen in FIG. 5C, the substrate 159' has a smooth (continuously curving) second convex curvature C2' in a horizontal dimension and, simultaneously, curves in a first (continuously curving) convex curvature C1 (FIG. 5D) arranged in a vertical dimension. More specifically, the second convex curvature C2' of the substrate 159' may have a closer shape or profile which tracks the contour of the user's head, forehead and temple.

FIG. 5D illustrates a partial side cross-sectional view of a portion of the convex display device 120 according to some embodiments. The top side 132 includes a maximum point 132M from which the display device 120 smoothly transitions in a direction toward the face of the wearer. For illustrative purposes, assume the maximum point 132M of the top side 132 on the substrate 159 also corresponds to pixel elements 131T placed along a row at the maximum point 132M of the top side 132.

The bottom side 134 includes a minimum point 134M from which the display device 120 smoothly transitions in a direction toward the face of the wearer. For illustrative purposes, assume the minimum point 134M on the substrate 159 of the bottom side 134 also corresponds to pixel elements 131B placed along a row at the minimum point 134M.

In some embodiments, the top side 132 and bottom side 134 of the display device 120 may generally end at the maximum point and the minimum point of the first convex curvature C1 of the substrate 159. The top side 132 may include a maximum point 132M which may sometimes be referred to as a top distal end of the display device. The top side 132 terminates at surface 133. The bottom side 134 may include a minimum point 134M which may sometimes be referred to as a bottom distal end of the display device. The bottom side 134 terminates at surface 135. The dashed lines at surfaces 133 and 135 denote the maximum and minimum points.

As shown, the substrate 159 may have a convex curvature C1 along a vertical dimension which has a generally C-shape wherein pixel elements 131 may to coupled or mounted to an exterior side of the substrate 159 to form a display screen 122 having a display area 125. The exterior side of the substrate 159 corresponds to the side of the substrate which radiates light therefrom in the direction of the reflective optical surface 112 (FIG. 1A). The interior side is generally adjacent to the forehead skin of the user. The convex curvature of the substrate 159 may vary along the vertical dimension.

Figure 5E:
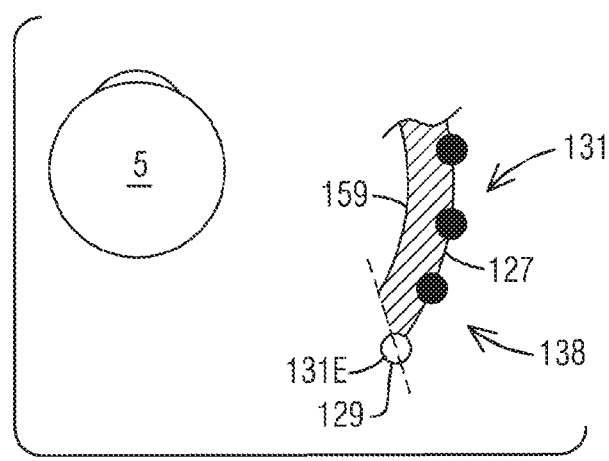
FIG. 5E illustrates a partial top cross-sectional view of a first side of a convex display device which is in proximity to the ear when the HMD apparatus is worn by the user according to some embodiments.

FIG. 5E illustrates a partial top cross-sectional view of a first side of a convex display device which is in proximity to the ear when the HMD apparatus is worn by the user according to some embodiments. For a display device mounted about the right eye, the right side of the display device ends with a first side 138 in proximity to the right ear of the wearer. For a display device mounted about the left eye, the left side of the display device ends with a first side in proximity to the left ear of the wearer. Therefore, only one first side (in proximity to the ear) will be described.

The first side 127 extends along the side of the wearer's face beginning in front of the face and extending in the direction rearward toward the ear. A forward end (not shown) of the first side 127 is integrated with and smoothly transitions about a generally rounded angle of the third convex curvature C3 from the front of the substrate 159 from which pixel elements 131 may selectively radiate. The first side 127 has a rearmost point 129 of the right side 138. In some embodiments, the pixel elements 131E, denoted as a circle, may be arranged in a row along the substrate 159 and in proximity to the wearer's ear.

Figure 5F:
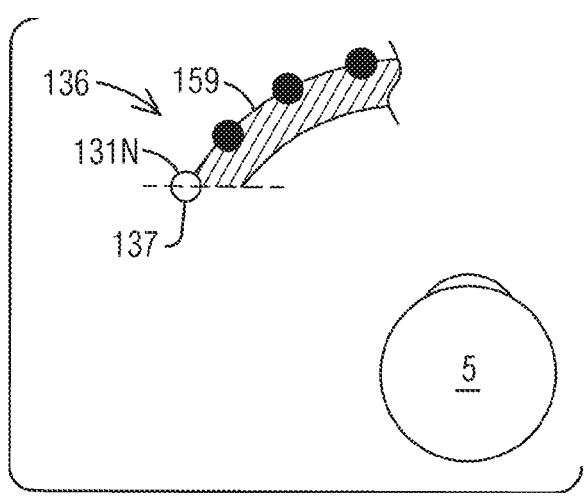
FIG. 5F illustrates a partial top cross-sectional view of a second side of a convex display device which is in proximity to the nose when the HMD apparatus is worn by the user according to some embodiments.

FIG. 5F illustrates a partial top cross-sectional view of a second side of a convex display device which is in proximity to the nose when the HMD apparatus is worn by the user according to some embodiments. For a display device mounted about the right eye, the left side of the display device ends with a second side in proximity to the right side of the wearer's nose. For a display device mounted about the left eye, the right side of the display device ends with its second side in proximity to the left side of the wearer's nose.

Therefore, only one second side will be described. In FIG. 5F, the second side of a right mounted display device is positioned along the leftmost point 137 or distal end of the left side 136 of the substrate 159 which is in proximity to the nose. In some embodiments, the substrate 159 may terminate at the leftmost point 137 having pixel element 131N.

Figure 6:
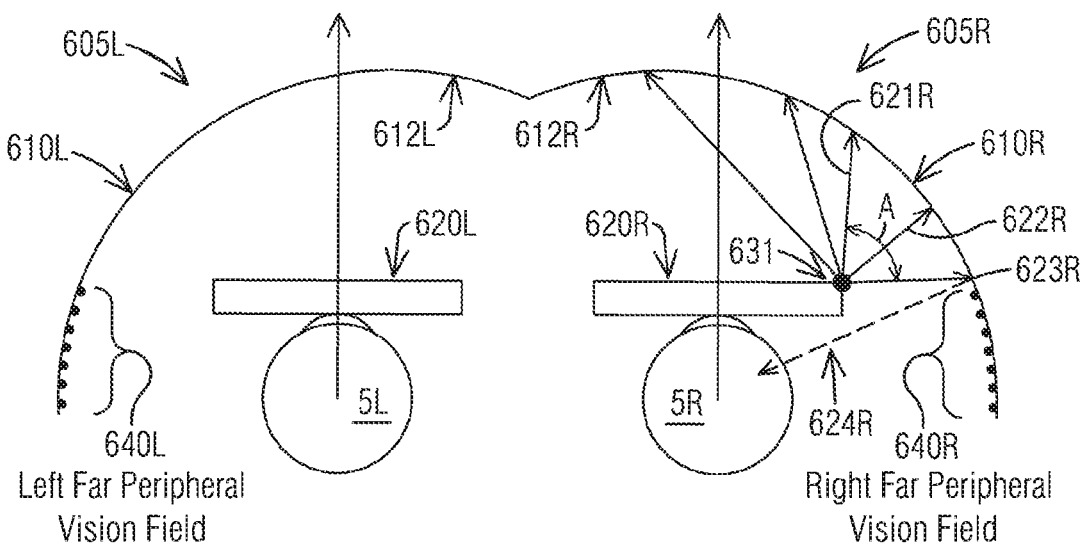
FIG. 6 illustrates flat, planar display substrates with the light being configured to be emanating out of the screen toward the lens of a continuous lens structure and reflected to the wearer.

FIG. 6 illustrates a pair of optical systems 605R and 605L using display devices 620R and 620L having flat, planar display substrates. FIG. 6 is shown to illustrate the challenges identified by the inventors when using flat, planar display substrates. FIG. 6 is related to the description of FIG. 9A. The display devices 620R and 620L are configured to emanate light out of the display screen toward the lens 610R and 610L, respectively which in turn is reflected to the wearer by the reflective optical surfaces 612R and 612L, respectively. The range of illumination from the display devices 620R and 620L does not reach around the temple of the wearer or to the distal limits of the full human horizontal field of view, shown as points 640R and 640L. As can be appreciated, extending the length of the display 620R and 620L having a flat display screen never allows the full human horizontal field of view to be reached using a single flat screen display device. Angling the flat display screen to extend to the corners of the lens to reach the full human horizontal field of view may allow the peripheral vision to be reached in the direction of the ear but not the peripheral vision of the wearer in the direction toward the nose.

Assume pixel element 631 is the distal most pixel on the display screen of display device 620R. The pixel element 631 emanates light along a plurality of rays of which ray 621R is normal to the display surface 620R. Rays 622R and 623R are to the right of the ray 621R, wherein ray 623R is emitted at the angle A from the normal for which light will disperse from the pixel element 631 at essentially non-radiant intensity, as will be described in relation to FIG. 8. Some of the rays have been omitted to simplify the drawing. As can be seen, the ray 623R, reflected along ray 624R to eye 5R, does not reach a location on the lens in the far peripheral vision field, contained in the area 640R. Thus, the display device 620R is not able to reach the full human horizontal field for the right eye limits. Specifically, the ray 623R cannot reach the right far peripheral vision field 640R. Likewise, the display device 620L cannot reach the left far peripheral vision field 640L. Therefore, when displaying CGC, the CGC disappears from view of the wearer in at least some or all of the far peripheral vision fields interrupting the full panoramic view capable of the human eyes. Ray 623R is a low-intensity ray at the edge of the limits of the light intensity emitted from the pixel as defined in FIG. 8.

Figure 7:
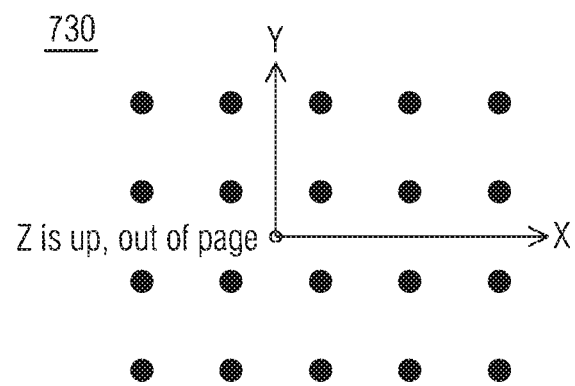
FIG. 7 illustrates a planar display of a plurality of pixel elements from a display device with equal distances between pixel elements.

FIG. 7 illustrates a planar display of a plurality of pixel elements 730 from a display device with equal distances between pixel elements. Using a curved display substrate or screen, there will be a small additional distance between immediately adjacent pixel elements due to the curvature. The geometry is in a non-Euclidean plane (i.e., a curved plane). In some embodiments, a set of pixel elements immediately adjacent to and surrounding a certain pixel of interest are all non-coplanar with respect to the pixel of interest. In some embodiments, a center pixel and its surrounding and adjacent pixel elements are arranged in a non-Euclidean plane.

In some embodiments, all pixel elements of the convex display device 120R or 120L (FIG. 4) may have the same distance between pixel elements. In other embodiments, pixel elements along the convex curvature of each side may have a different distance consistent with the curvature.

If the pixel elements are ordinated such that they are in a Cartesian grid, with x to the right, y toward the top, and z out of the page, as in FIG. 7, then, as the display device is bent or curved, the pixel elements move from their original locations. For instance, if the right side of the display screen is pushed into the page, then the z coordinate of the bent pixel elements will take on negative values, and the x coordinate would decrease slightly for each specific pixel element.

The inventors have determined that a benefit of the curving (convex) display device is that pixel elements are non-coplanar and can have different distances away from the optical surface 112 than that occurring with a flat display device. In this way, the standard deviation of the distance from a specific pixel element to its specific reflecting point on the reflective optical surface can be made to be smaller, as the distance will change less from pixel/reflection point pair to pixel/reflection point pair, if the curved (convex) form of the display device is similar to the curved form of the lens (i.e., lens 110). This results in less change needed in the radius of curvature for each reflective area in order to collimate the light coming from a corresponding pixel element, thus making the lens easier to manufacture and to calculate whereby the lens is more self-similar from point to point and also allows more error to be tolerated in aligning the reflective optical surface of the lens to the convex display device, when the inter-pixel curvature change of the reflector is minimized. This is seen by analysis of FIGS. 16A-16B which show graphs 1600A and 1600B of a top view of a curved reflective optical surface 1610, a curved (convex) display device 1620B, and a flat display device 1620A that is calculated to be at the mean y height of the curved display device. The lens and display device can be considered to be symmetric in three dimensions about the x=0 axis and thus, the standard deviation will be calculated for just the positive x axis. The standard deviation is calculated in the following manner, using example values in the equations for the different components. The equation for the lens in this calculation is $$p_r(x) = 2\cos(1.3x) + 0.5.$$

wherein the subscript r denotes an equation for the reflector lens; and x represents a value on the positive x axis.

The equation for the curved display in this example is $p_c(x) = \cos(1.3x)$ wherein the subscript c denotes an equation for the curved display. The mean value of $p_c(x)$ over the range of x=[0 . . . 1] is represented by the following equation for the flat display, $p_f$:

$$p_f = \int_0^1 \cos(1.3x)dx$$
$$= \sin(1.3)/1.3$$
$$= 0.7412$$

The definition of the standard deviation, σ, is the positive result of $$\sigma = \sqrt{\frac{\sum_{i=1}^{N}(x_i - \overline{x})^2}{N-1}}$$

where
$x_i$=a set of N numbers along the x axis; and
$\bar{x}$=the mean value of $x_i$.
Converting to a continuous form yields $$\sigma_c = \sqrt{\int_0^1 [v_i(x) - \bar{v}]^2 dx}$$

where the denominator is 1, and $v_i(x)$ can be $v_{i_c}(x)$ for the curved display or $v_{i_f}(x)$ for the flat display, where $$v_{i_c}(x) = [p_r(x) - p_c(x)]$$

for the curved (convex) display device, and $$v_{i_f}(x) = [p_r(x) - p_f]$$

for the flat display device, and $\bar{v}$ was calculated before as the mean position of the displays, or $$\vec{v} = p_f$$

which is the mean value for both the flat (f) and the curved display devices. Performing the standard deviation integral for the distance from pixel to reflective point, assumed to be at a vertical distance in the y dimension, for the curved (convex) display device and the flat display device shows $$\sigma_{flat} = \sqrt{\int_0^1 \{[p_r(x) - p_f] - p_f\}^2 dx}$$
$$= 0.6701$$

and $$\sigma_{curved} = \sqrt{\int_0^1 \{[p_r(x) - p_c(x)] - p_f\}^2 dx}$$
$$= 0.5475.$$

Thus, the difference from pixel to reflection point, or oxel, is more stable using a curved display, having a smaller standard deviation σ. This can be exploited more as the actual curvatures are calculated and established across the actual device during design.

This smaller standard deviation of distances to the reflector (i.e., reflective optical surface 112) means that the radius of curvature of the lens 110 does not need to change as much across the surface to perform optical collimation for the light from every pixel element at different locations on the surface and may be a more easily manufactured lens with perhaps a bigger eye-box.

The convex display device is curved to radiate light of pixel elements on the display screen to a reflective surface of the lens. The pixel elements of the convex display screen maintain the same distance from each other, in the sense that if a flexible ruler is laid across the display screen between the pixel elements, the distance will be essentially the same between pixel elements on the convex display screen as they are on a flat display screen.

Further details of improvement of the embodiments of the optical systems herein will be described in more detail in relation to FIGS. 9A-9B, 10A-10B and 16A-16B.

Figure 8:
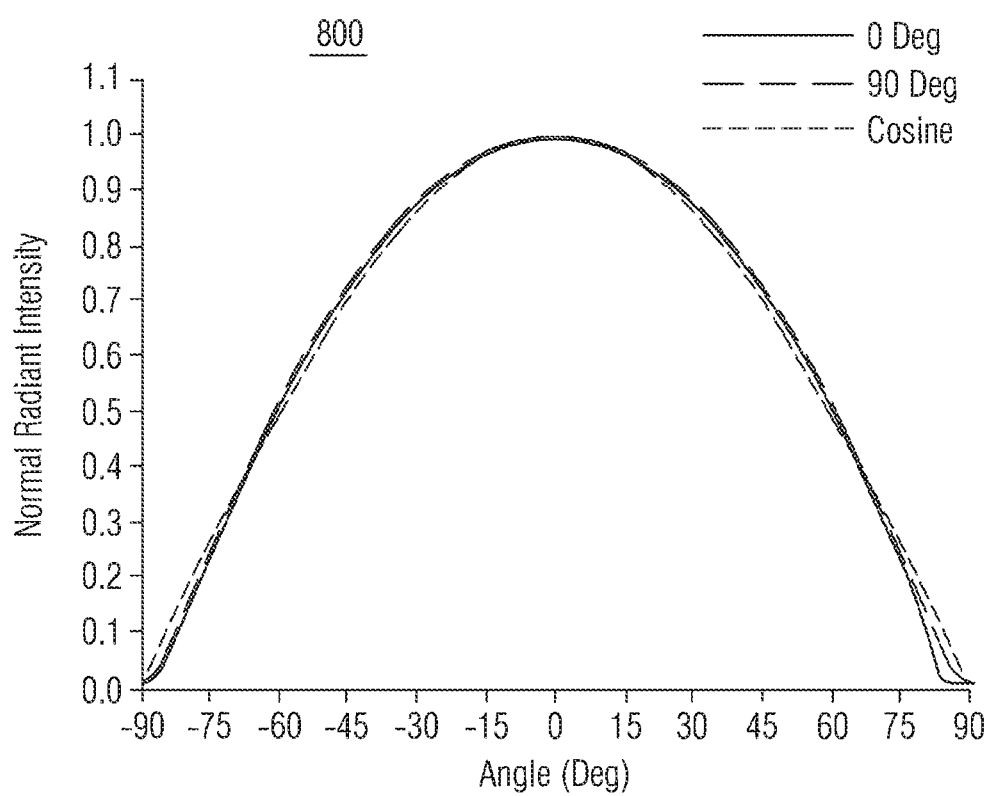
FIG. 8 illustrates graphical representations of normal radiant intensity (illumination intensity) fall-off verses an angle away from the surface normal curves and a cosine graph is superimposed.

FIG. 8 illustrates graphical representations 800 of normal radiant intensity (illumination intensity) fall-off verses an angle away from the surface normal curves for angles between 0 and 90 degrees. It is seen that at 90 degrees the luminous intensity is essentially zero. The graphical representations 800 will hereinafter be referred to as "intensity curves 800." FIGS. 9 and 10 will be described in relation to the intensity curve of FIG. 8.

Figure 9A:
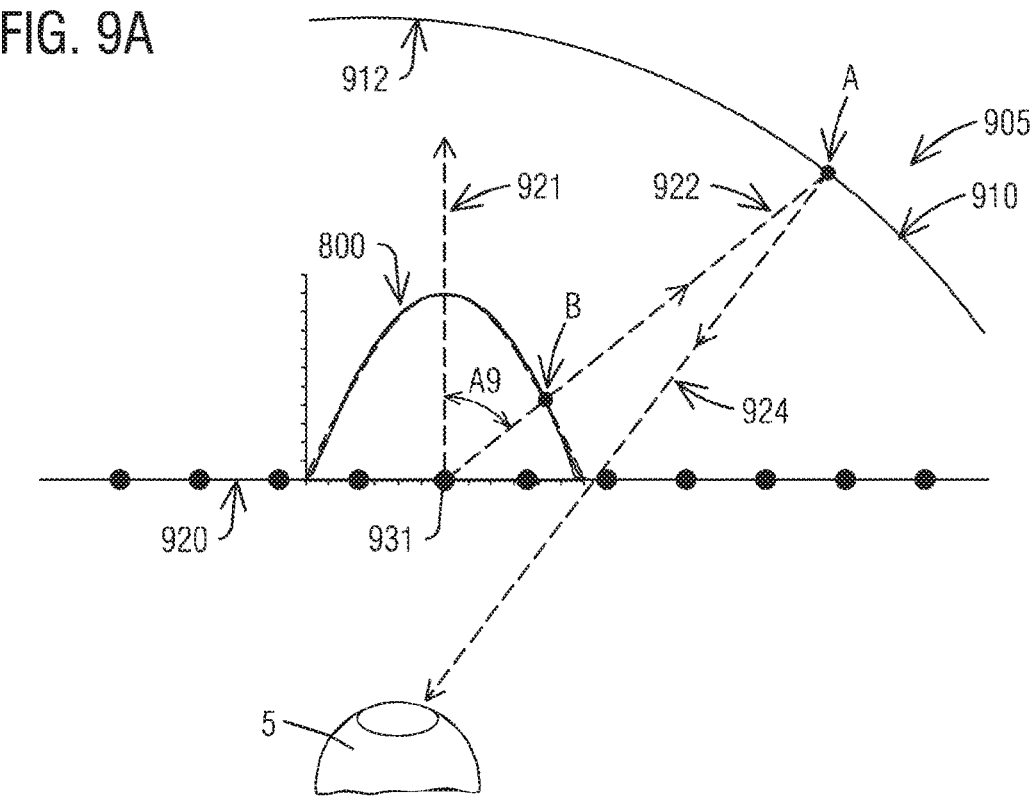
FIG. 9A illustrates a diagram of a respective one pixel element on a straight or flat display device reflecting from a location on a reflective optical surface.

FIG. 9A illustrates a diagram of a respective one pixel element 931 on a straight or flat display device 920 reflecting from one location. The diagram illustrates the straight or flat display device 920 relative to the reflective optical surface 912 of lens 910. Furthermore, the eye 5 of the wearer is obtaining light from the respective one pixel element 931 at a lower intensity portion of the available light from that pixel element because the light reflected from point A, and the light ray 922 is emanating from an area of lower luminous intensity for pixel 931, cutting the luminous intensity curve at point B, by way of non-limiting example.

In FIG. 9A, the intensity curves 800 represent the illumination field of pixel element 931. The ray 921 is normal to the pixel element 931 on the surface of the flat display device 920 and is shown intersecting the peak of the intensity curves 800. An offset ray 922 is representative of dispersed light from the pixel element 931 at an angle A9 and, at point B, intersects the intensity curves 800 which is at a lesser intensity in the direction of the reflection point A, for example, on the reflective optical surface 912. Ray 924 is representative of a reflected ray related to the reflection point A as the offset ray 922 impinges on the reflective optical surface 912.

With the use of a flat display device 920, all the surface normal rays point forward from the surface of the display device 920. If it is desired to illuminate part of the reflector (i.e., reflective optical surface 912) that is off in the field, such as angle A9=52° to the right of the particular pixel element (i.e., pixel element 931) in the direction of the mid peripheral vision fields, a decrease in illumination for that pixel reflection is realized as represented by the intersection of the offset ray 922 on the intensity curves 800, as shown in FIG. 9A. Specifically, the pixel light intensity may be decreased by 40% due to the offset ray 922 from the intensity of the reflected light from the ray 921 emanated to the reflective optical surface of the lens along the display normal, especially when the reflection point is in the peripheral vision field.

Figure 10A:
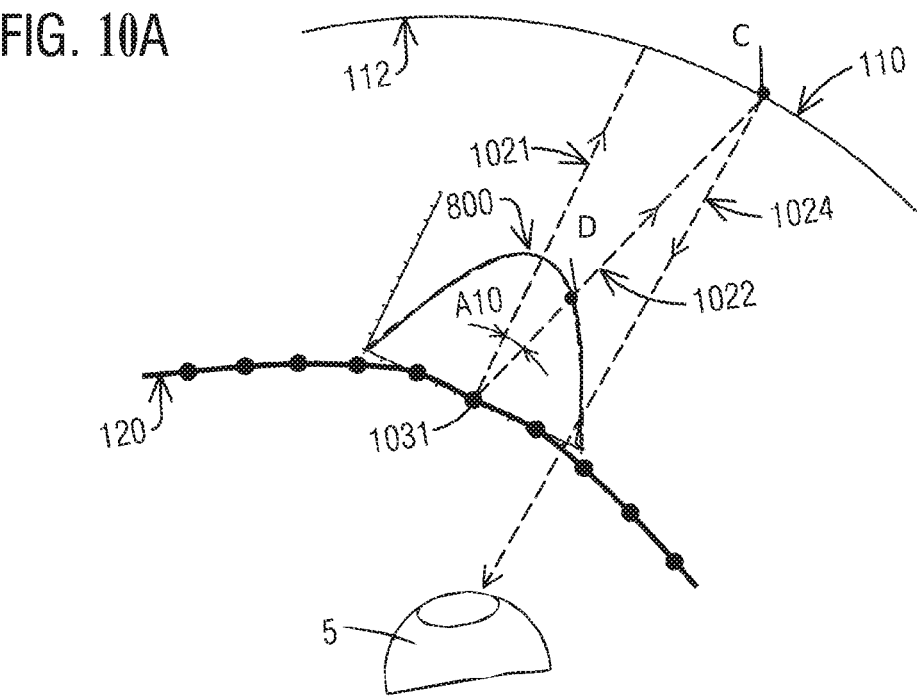
FIG. 10A illustrates a diagram of a respective one pixel element on a convex display device reflecting from a respective one location on the reflective optical surface.

FIG. 10A illustrates a diagram of a respective one pixel element 1031 at a point on a curved display device 120 (FIG. 1A) reflecting from location on the reflective optical surface 112. As can be seen in FIG. 10A, if the curved display device 120 is oriented to point the specific pixel element 1031 toward the specific spot on the reflector (reflective optical surface) from which the light of the pixel element 1031 will reflect into the eye, then the intensity of the light is increased, providing a brighter image relative to a flat display device. The ray 1021 intersects the intensity curves 800 at the peak of the intensity.

As can be appreciated by the description herein, the display device is not pointing pixel elements at locations on the reflector (i.e., reflective optical surface 112), except only generally. The way that the reflector (i.e., reflective optical surface 112) is designed is that there is only one spot on that reflector (i.e., reflective optical surface 112) that will reflect that pixel element and collimate the light therefrom into the eye of the user, for a particular configuration of eye, lens, and display device.

By way of non-limiting example, assume it is desired to illuminate part of the reflective optical surface 112 off in the field, such as a point C, on the reflective optical surface 112.

The intensity angle A10=20° is demonstrated to the right of the particular pixel element 1031, on the reflective optical surface of the convex display device 120, for illustrative purposes. The designed directivity can illuminate part of the reflective optical surface 112 in the direction of the peripheral vision fields with a decrease in illumination for that pixel reflection, as represented by the point of intersection D of the offset ray 1022 with respect to the intensity curves 800, as shown in FIG. 10A. As can be appreciated the angle A10 is less than half the angle A9 produced by a flat planar display device. Nonetheless, the arc of the convex curvature of the substrate may vary the angle A10 as the curvature changes over the longitudinal length of the display screen, for example. However, this decrease in illumination associated with a convex curved display device is less than the decrease in illuminations realized in comparison with a flat display device. Specifically, the pixel light intensity from pixel element 1031 using a convex curved display device may be decreased by 7% due to the offset ray 1022 of the reflected light from the normal ray 1021. The offset ray 1022 is reflected from the reflective optical surface 112 along a corresponding collimated offset ray 1024 toward the user's eye.

As can be seen, angle A10 is 20° in this example. However, the amount of degrees of the angle A10 depends on where the location of the pixel element (i.e., pixel element 1031) is with respect to where the reflection point on the reflective optical surface of the lens is and the eye. The angle A10 is a function of the convex curvature in the horizontal dimension, especially in proximity to the region of the far horizontal peripheral vision fields of each respective eye. Nonetheless, with respect to FIG. 9A, there is light available from the pixel element from 0° to nearly 90°. In relation to FIG. 8, 0° corresponds to the center or peak of the intensity curves 800 and 90° corresponds to essential zero or nearly zero intensity.

Hence, in comparison, the inventors have determined that the optical systems 105R and 105L (FIG. 5B) with a curved display device, relative to optical systems 905 with flat display devices 920, provides for an improvement (i.e., increase in pixel intensity reflected to the wearer) such that a lesser amount of a pixel intensity decrease is realized by the wearer while also increasing the points of impingement of emanating light into the mid and far peripheral vision fields.

Figure 9B:
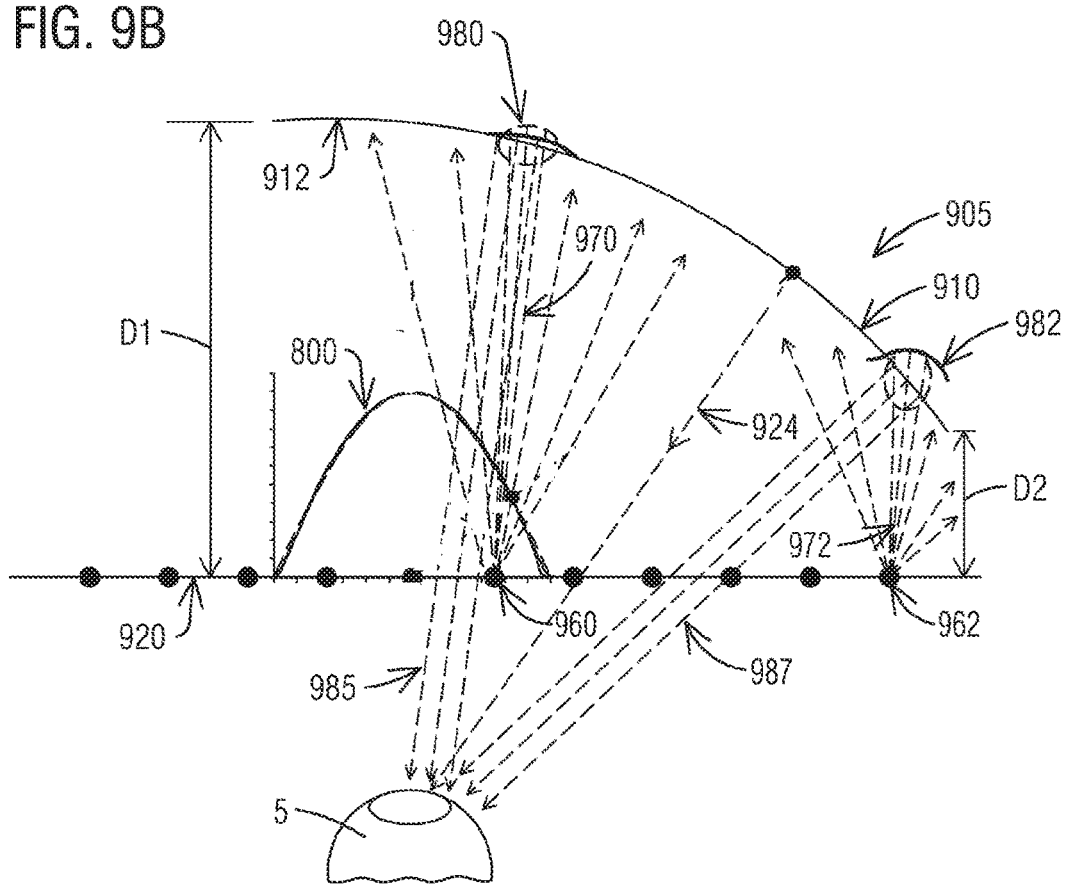
FIG. 9B illustrates a diagram of reflected and collimated rays to the user's eye based on the flat display device of FIG. 9A.
Figure 10B:
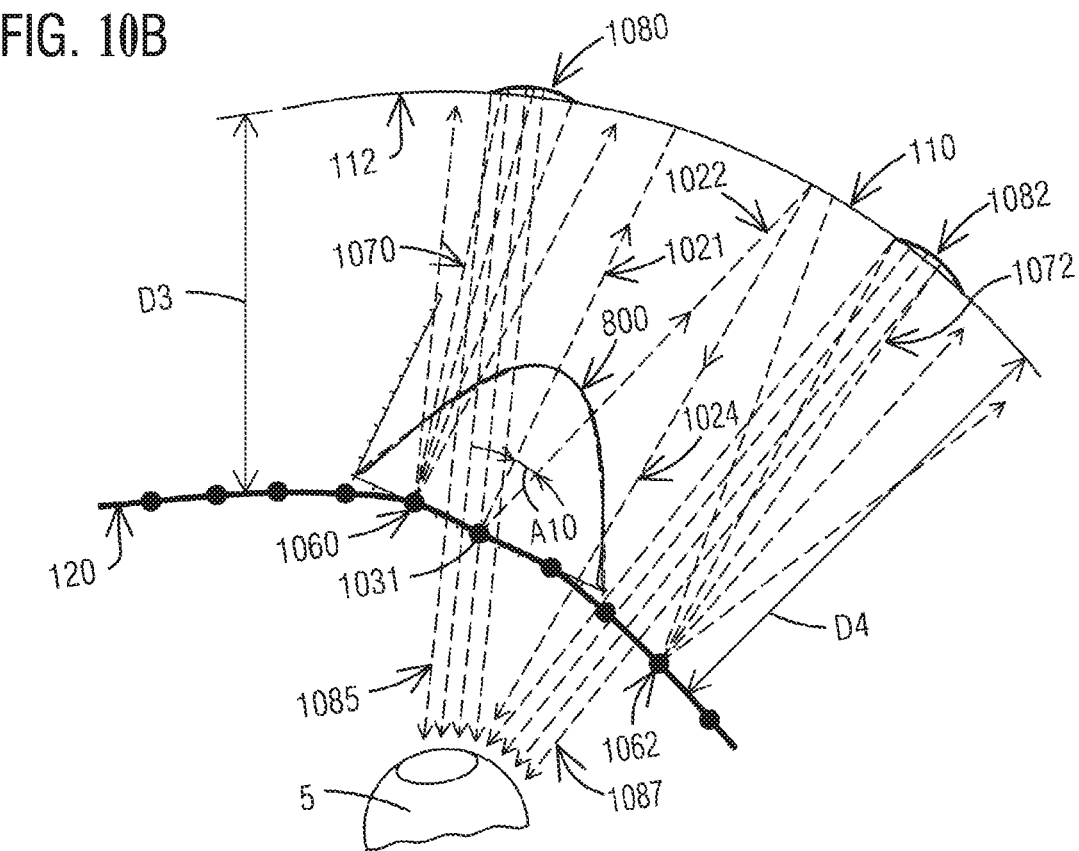
FIG. 10B illustrates a diagram of reflected and collimated rays to the user's eye based on the convex display device of FIG. 10A.

For illustrative purposes for the understanding of the embodiments, a comparison of FIGS. 9B and 10B will be described. FIG. 9B illustrates a diagram of reflected and collimated rays to the user's eye based on the flat display device of FIG. 9A. FIG. 9B is similar to FIG. 9A previously described. Thus, only the new elements of FIG. 9B will be described although most of the elements described in relation to FIG. 9A remain numbered in FIG. 9B. FIG. 10B is similar to FIG. 10A such that only new elements in FIG. 10B will be described.

In FIG. 9B, rays 970 from pixel element 960 are shown directed to predetermined location 980 on the reflective optical surface 912. Furthermore, rays 972 from pixel element 962 are shown directed to predetermined location 982 on the reflective optical surface 912. In the illustration, the distance between pixel element 960 and the reflective optical surface 912 at the location 980 is greater than the distance between pixel element 962 and the reflective optical surface 912 at location 982, the reflection point. Hence, when designing the reflective optical surface 912, each pixel element's location of reflection (i.e., locations 980 and 982) is curved to also collimate the reflected ray. However, the curvature at location 980 is less than the curvature at location 982 as a result of a greater optical power needed at location 982 to collimate the light beams that come from the shorter distance away. The curvature calculations refer to the calculations to form the reflection points or oxels at the reflective optical surface of a lens. Such calculations may be based on the oxel calculations so that the reflected rays are also collimated to the eye of the user.

In FIG. 9B, the distance between pixel element 960 is slightly less than the distance denoted by distance D1. The distance between pixel element 962 is slightly greater than the distance denoted as D2 wherein distance D1 is greater than distance D2. Because of the disparity in length between distances D1 and D2, the curvature calculated to collimate the ray 972 at location 982 for the optical power correction/alignment of corresponding pixel element 962 is higher relative to the curvature calculated to collimate ray 970 at location 980 for the corresponding pixel element 960. This configuration requires a larger curvature at location 982 to collimate the rays 987 to the user's eye 5, than from location 980. This requires that the radius of curvature of the lens must change more rapidly between area 980 and 982 than would be necessary if the display was curved, making the lens more complicated to manufacture and the resulting alignment of lens to display more critical. The reference numerals 980 and 982 also refer to a representative arc of curvature for the reflection point location.

On the other hand, FIG. 10B illustrates a diagram of reflected and collimated rays to the user's eye based on the convex display device of FIG. 10A. In FIG. 10B, rays 1070 from pixel element 1060 are shown reflected from predetermined location 1080 on the reflective optical surface 112. In the illustration, the distance between pixel element 1060 and the reflective optical surface 112 at location 1080 is approximately the distance denoted as D3. Likewise, rays 1072 from pixel element 1062 are shown reflected from predetermined location 1082 on the reflective optical surface 112. In the illustration, the distance between pixel element 1062 and the reflective optical surface 112 at location 1082 is approximately the distance denoted as D4. As can be seen, the disparity or difference in length between distances D3 and D4 for a curved display device configuration compared to the differences in length between distances D1 and D2 for a flat display device configuration is much less for the curved display device configuration. Hence, the curvature at locations 1080 to collimate rays 1070 to the user's eye 5 and the curvature at location 1082 to collimate rays 1072 to the user's eye 5 are more identical than the similar curvatures in FIG. 9B with a flat display, and result in a lens that is easier to manufacture with less criticality in placement of the display because the focus changes less across the field of view allowing slight movement of the display laterally across the plane of the display.

Figure 16A:
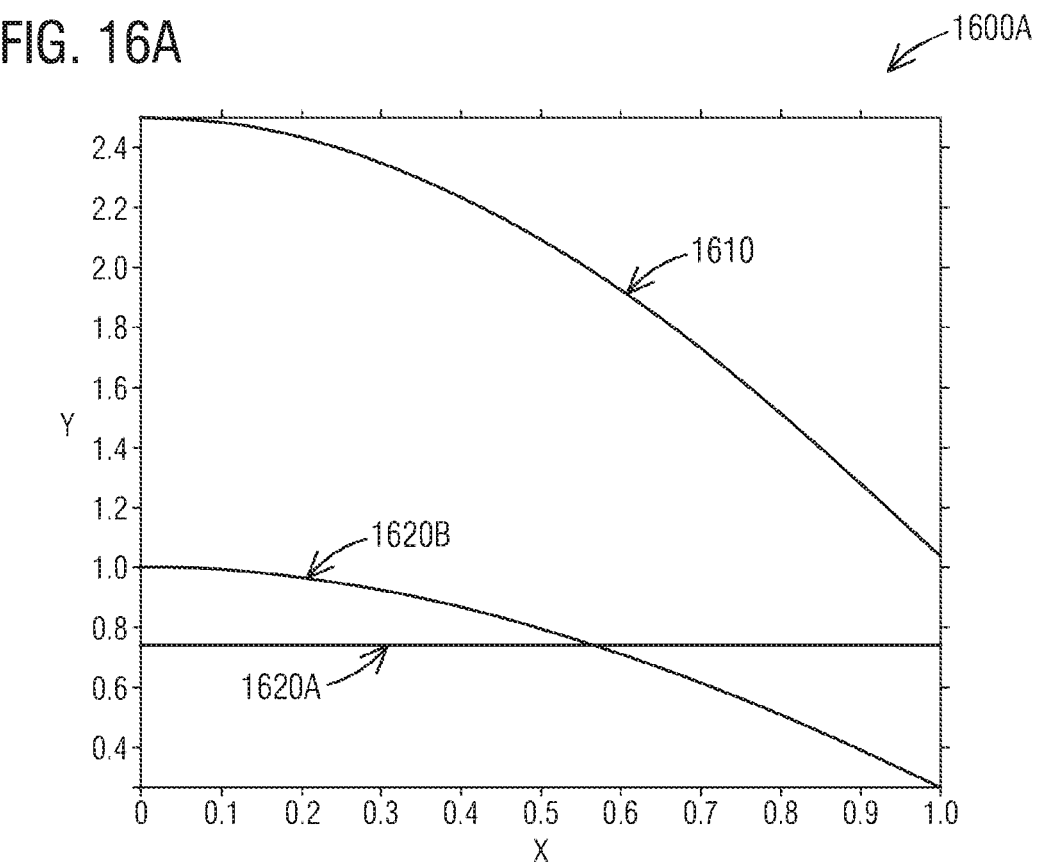
FIG. 16A illustrates a graph of a side view of a curved reflective surface, a convex display device, and a flat display device that is calculated to be at the mean y height of the convex display device.

FIG. 16A illustrates a graph 1600A of a top view of a curved reflective surface of lens 1610, a convex display device 1620B, and a flat display device 1620A that is calculated to be at the mean y height of the convex display device 1620B. As previously described in relation to FIGS. 9B and 10B, the difference in length between distances D3 and D4 between the convex display device 120 (i.e., convex display device 1620B) relative to the reflective optical surface 112 is less than the difference in length between distances D1 and D2 between the flat display device 920 (i.e., flat display device 1620A) relative to the reflective optical surface 912. In the illustration of FIG. 16A, the convex display device 1620B and the flat display device 1620A are shown graphed relative to the same reflective optical surface of the same lens 1610.

Figure 16B:
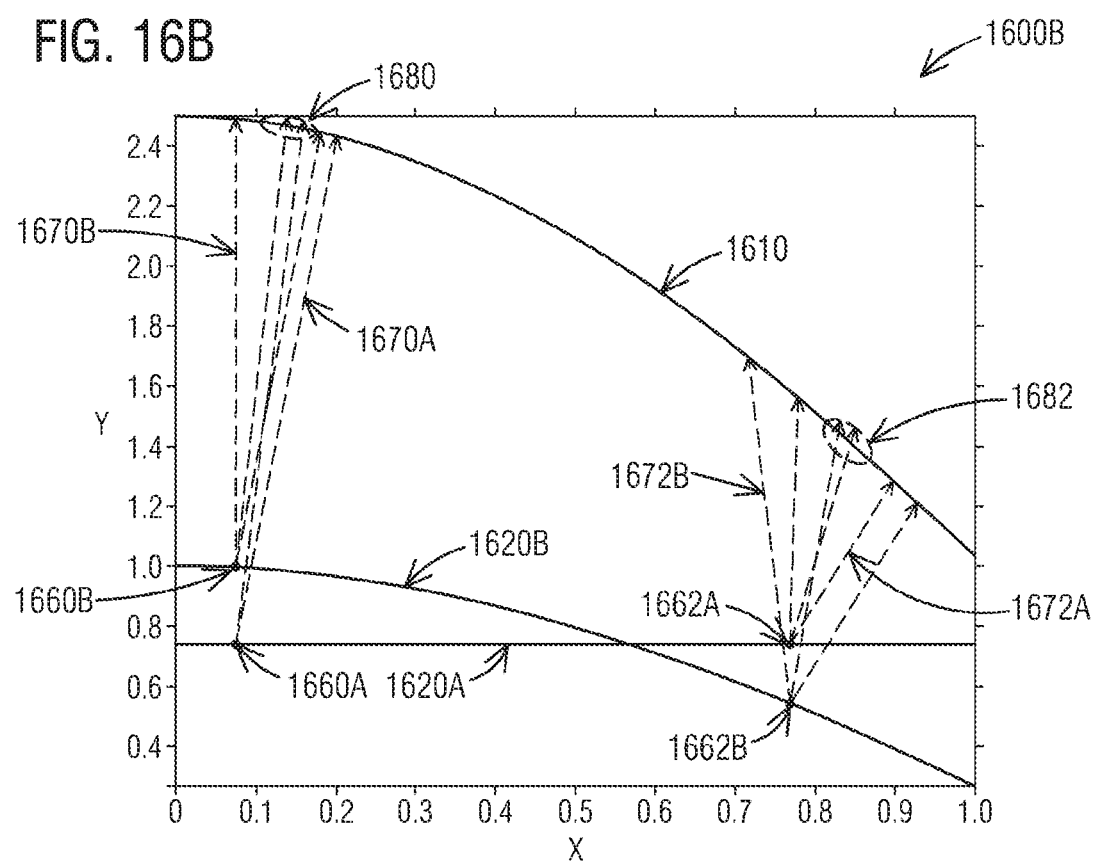
FIG. 16B illustrates a graph of a side view of a curved reflective surface, a convex display device, and a flat display device that is calculated to be at the mean y height of the convex display device of FIG. 16A including first reflected light rays originating from the convex display device and second reflected light rays originating from the flat display device.

FIG. 16B illustrates a graph 1600B of a top view of a curved reflective surface of lens 1610, a convex display device 1620B, and a flat display device 1620A that is calculated to be at the mean y height of the convex display device of FIG. 16A including first reflected light rays originating from the convex display device and second reflected light rays originating from the flat display device. In FIG. 16B, rays 1670B from pixel element 1660B of convex display device 1620B are shown reflected from predetermined location 1680 on the reflective optical surface of lens 1610. Rays 1670A from pixel element 1660A of flat display device 1620A are shown reflected from the same predetermined location 1680 on the reflective optical surface of the same lens 1610 for reflection to a user's eye.

Rays 1672B from pixel element 1662B of convex display device 1620B are shown reflected from predetermined location 1682 on the reflective optical surface of the same lens 1610. Rays 1672A from pixel element 1662A of flat display device 1620A are shown reflected from the same predetermined location 1682 on the reflective optical surface of the same lens 1610.

In the illustration, the difference in length between the distance (i.e., distance D1 of FIG. 9B) between pixel element 1660A on the flat display device 1620A to the reflective optical surface of lens 1610 at location 1680 verses a distance (i.e., distance D2 of FIG. 9B) between pixel element 1662A to the reflective optical surface of lens 1610 at location 1682 is greater than the corresponding difference in length between the distance (i.e., distance D3 of FIG. 10B) between pixel element 1660B for a convex display device 1620B to the location 1680 and a distance (i.e., distance D4 of FIG. 10B) from pixel element 1662B to the location 1682. Assume that the pixel element 1660A on the flat display device 1620A is essentially vertically aligned with pixel element 1660B on the convex display device 1620B.

The disparity in length between the distance of pixel elements to the right of pixel element 1662A of the flat display device to other locations to the right of location 1682, such as locations in the far peripheral vision field of view, on the same lens 1610, increases at a greater rate than the disparity in distances between pixel elements to the right of pixel element 1662B of the convex display device 1620B to locations to the right of location 1682 of the same lens 1610.

The optical power at a particular location on the reflective optical surface is a function of the distance between the pixel element on a display device and the associated point on the reflective optical surface. In the convex display configuration, the distance differential when comparing the distance between each and every pixel element on the convex display device to the reflective optical surface along the curvature horizontally of the convex display device is less than the distance differential of each and every pixel for a flat display device configuration. Hence, the curvature differential between the curvature of a calculated oxel (or arc of curvature) at each location for each pixel element's reflection on the reflective optical surface for the optical power correction/alignment from pixel element to pixel element is less than the curvature differential for a flat display device.

FIG. 16C illustrates a graph 1600C of a side view of a curved reflective surface, a convex display device, and a flat display device that is calculated to be at the mean y height of the convex display device of FIG. 16A including first reflected light rays originating from the convex display device relative to a location on the curved reflective surface below the flat display device. FIG. 16C includes similar elements and reference numerals as in FIG. 16B. Thus, generally only the differences will be described.

In FIG. 16C, assume the pixel elements 1662A and 1662B are vertically aligned. The angle A16A between rays 1672A, denoted in a dashed configuration from pixel 1662A, and the ray to the desired reflection point at 1682 is much greater than the angle A16B between rays 1672B', denoted in dash, dot, dot configuration to the location 1682, and the ray to the desired reflection point at 1682. For example, the angle A16A may be between 70°-80°. However, a much smaller angle such as the angle A16B can be achieved with the curved display 1620B. Angle A16B may be approximately 30°-45° depending on the configuration of the display device 1620B to the lens 1610. In the same figure (FIG. 16C), the lens 1610 includes another predetermined location 1684. Because of the curvature of display device 1620B, a correspondingly paired pixel element in the area 1690 bracketed to the right of pixel element 1662B can reflect its emanating light from location 1684. However, there are no available pixel elements to the right of pixel element 1662A in flat display device 1620A to reach such location 1684, and the pixels on display 1620A do not broadcast light in the reverse direction and would be unable to illuminate the reflective area 1684 since they point away.

FIG. 11 illustrates a first perspective view of a lens 110 relative to a convex display device 120 for a head-mounted display (HMD) apparatus. Grid 1102 is shown for illustrative purposes only. The lens 110 and curved display device 120 are generally the same as shown in FIG. 1A. The display screen 122 of the convex display device 120, associated with an eye, may have a first convex curvature C1, in a vertical dimension, along the longitudinal length of the display screen 122, a second convex curvature in a horizontal dimension of the display screen 122, and a third convex curvature C3 along an area in front of the temple or side of the face of the wearer to direct the emanating light from the screen to the distal end of the far peripheral vision field associated with the eye. The curvatures C1, C2 (FIG. 5B) and C3 are continuously changing with smooth transitions. The second convex curvature C2 being configured to direct the emanating light from the screen to the distal end of the mid peripheral vision field of an adjacent eye or the second side. The first and second curvatures C1 and C2 are arranged to radiate light of displayed CGC to a reflective optical surface for subsequent reflection into the wearer's eye to appear in a predetermined human field of view and, in some embodiments, up to the full human field of view for a single eye. Thus, two optical systems with the convex display devices 120R and 120L would illuminate up to the full human horizontal field of view for both eyes. The third convex curvature C3 forms a smooth transition in the second convex curvature C2 around the temple. However, the third convex curvature C3 in general being configured to maintain the smooth transitions of the continuously changing curvature of the first convex curvature C1 in the horizontal dimension. That portion of the second convex curvature C2 between the second side and the third convex curvature C3 being the front display area 125. In some embodiments, the distance between the top side 132 and bottom side 134 may vary. Hence, the first convex curvature C1 may vary. However, as the curvature C1 is varied, such changes are formed with smooth transitions.

The convex display device 120 may include a plurality of pixel elements arranged in column and rows. In FIG. 11, a set of column arrays of pixel elements 1130 are shown arranged along the convex curvature of the convex display device 120 wherein, in some embodiments, the pixel elements along the convex curvature of the top side 132 may allow their reflections to reach the upper vertical limit of the human vision field, as will be discussed in relation to FIG. 12, as the display device 120 continuously curves. Likewise, the set of column arrays of pixel elements 1130 may be arranged along the convex curvature of the convex display device 120 wherein, in some embodiments, the pixel elements along the convex curvature of the bottom side 134 may allow their reflections to reach down to the lower vertical limit of the human vision field, as will be discussed in relation to FIG. 12, as the device 120 continuously curves.

The pixel elements 1130 may have a non-Euclidean pixel arrangement such that the pixel elements are arranged in a non-coplanar manner along the vertical dimension and horizontal dimension.

Figure 12:
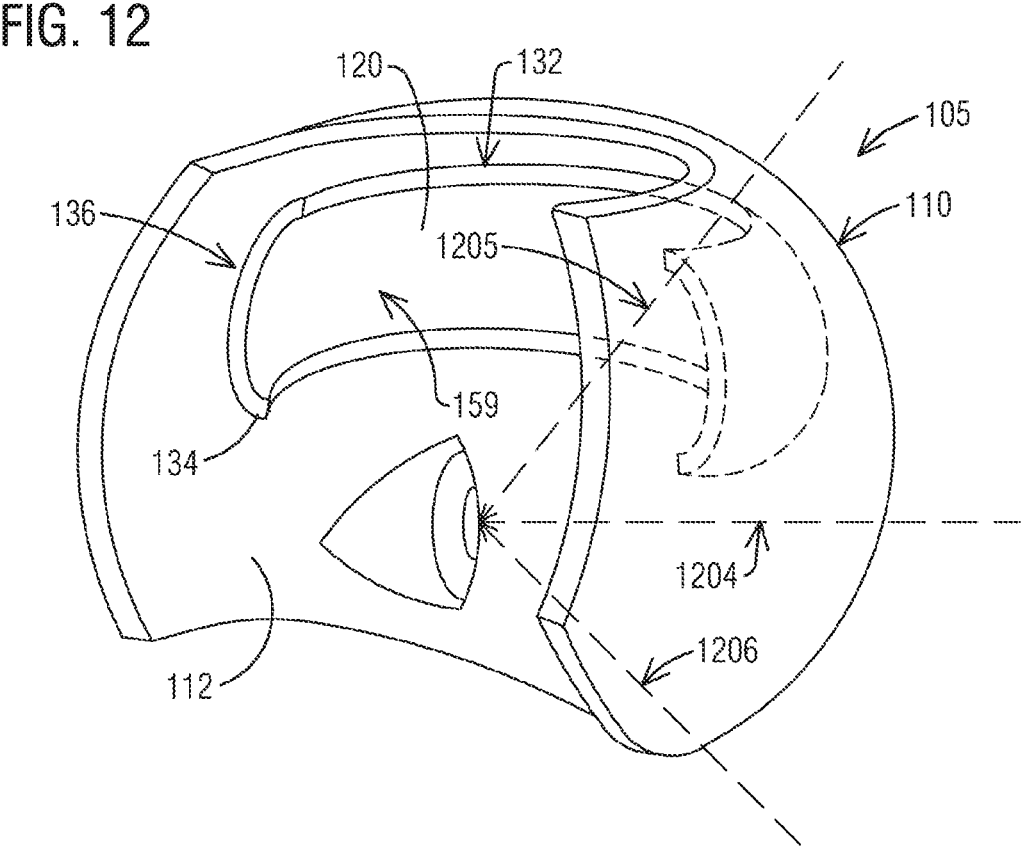
FIG. 12 illustrates propagated light rays from the real world passing through the lens of a head-mounted display (HMD) apparatus along the full human vertical field of view of a single eye.

FIG. 12 illustrates propagated light rays from the real world passing through the lens 110 relative to the convex display device 120 of the optical system 105 for a head-mounted display (HMD) apparatus along the full human vertical field of view. The vertical vision field includes a standard (forward) line of sight, denoted at line 1204, which may be registered to 0°. Above the standard (forward) line of sight there is an upper visual field, denoted at line 1205, which extends approximately 50° in an upward direction. Below the standard line of sight, denoted at line 1206, there is a lower visual field which extends approximately 70° in a downward direction. In some embodiments, the lens 110 may pass the real-world view in a predetermined vertical field of view wherein the predetermined vertical field of view is less than the full human vertical field of view.

Figure 13A:
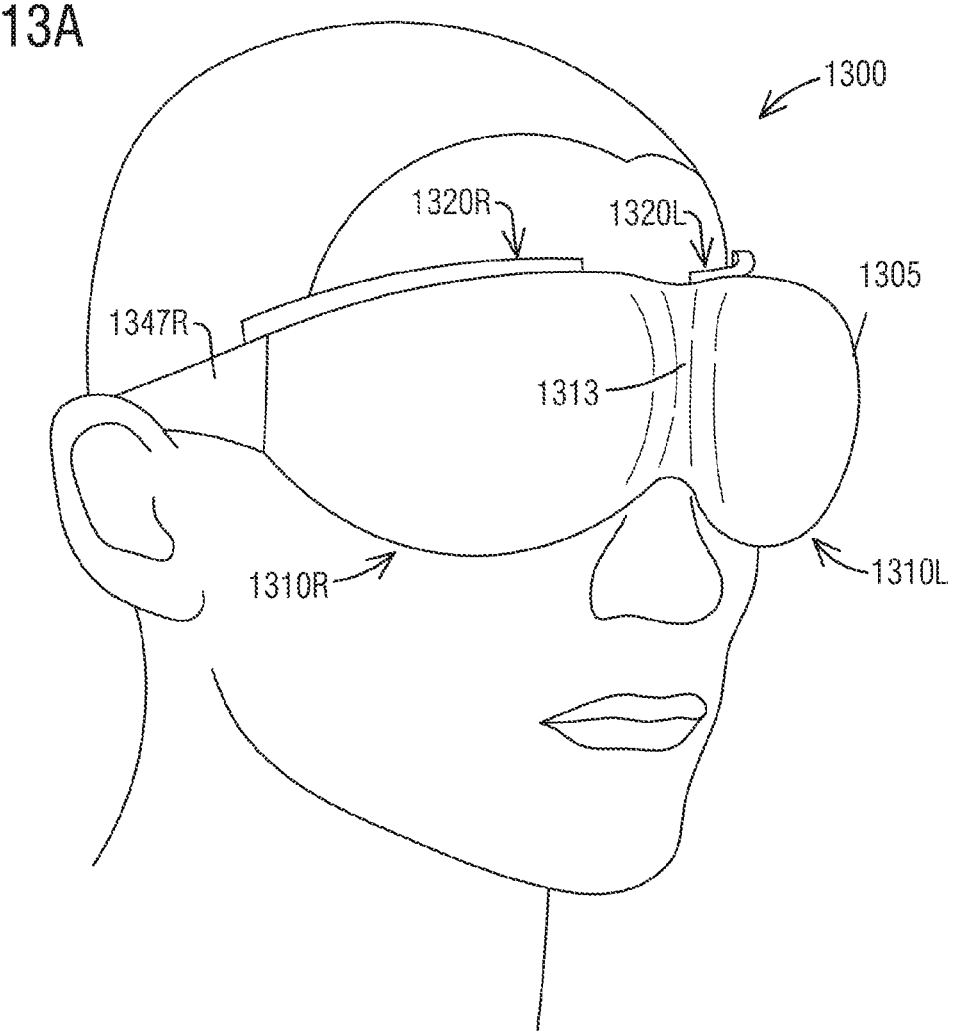
FIG. 13A illustrates a perspective view of a head-mounted display (HMD) apparatus having a continuous lens structure and a pair of convex display devices.
Figure 13B:
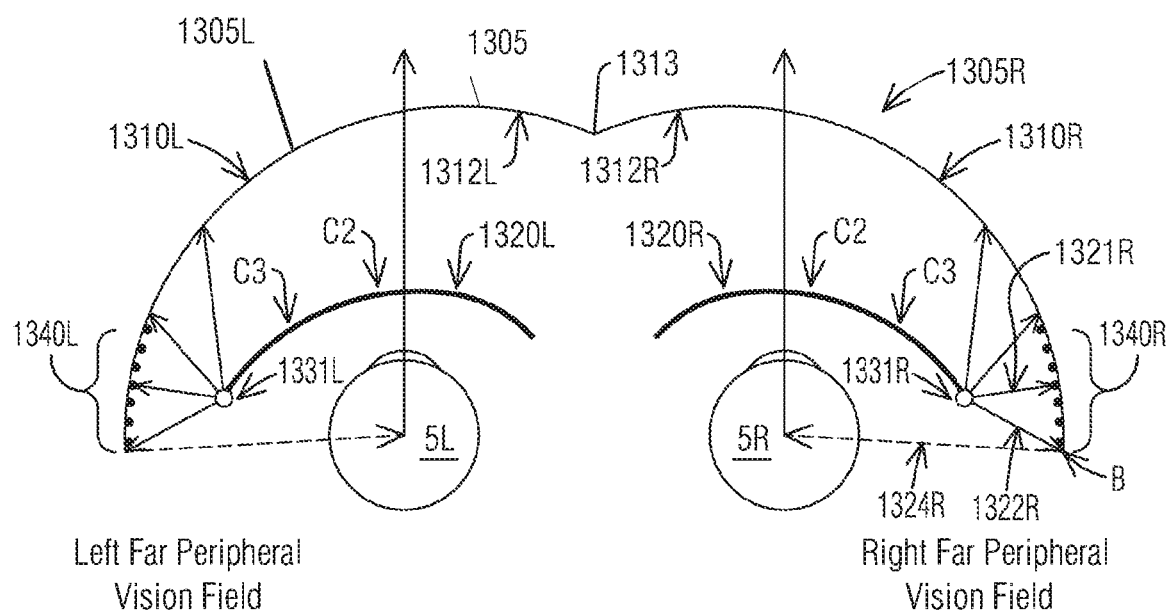
FIG. 13B illustrates an optical system of FIG. 13A including a continuous lens structure and a pair of convex display devices.

Referring also to FIG. 13A, a perspective view of a head-mounted display (HMD) apparatus 1300 with a continuous lens structure 1310 and a pair of convex display devices 1320R and 1320L is illustrated. A continuous lens structure may omit the nose bridge which may attach two separate lenses together in proximity of the nose, as shown in FIG. 4. The continuous lens structure 1310 may include lens (first) portion 1310R which is integrated with or merged with the lens (second) portion 1310L using an optical material or material fusion at center location 1313. The center location 1313 may be at the center of the nose. The HMD apparatus 1300 is held about the wearer's head using arms (only arm 1347R shown) attached to the lenses 1320R and 1320L. The lens (first) portion 1310R is associated with a respective one (first) convex display device 1320R to form a first optical subsystem 1305R (FIG. 13B). The lens (second) portion 1310L is associated with a respective one (second) convex display device 1320L (FIG. 13B) to form a second optical subsystem 1305L (FIG. 13B). The first optical subsystem 1305R and the second optical subsystem 1305L function the same as a right optical system and a left optical system, respectively, except that the lens is a continuous structure. The first optical subsystem 1305R and the second optical subsystem 1305L from a single optical system 1305.

FIG. 13B illustrates an optical system 1305 of FIG. 13A using display devices 1320R and 1320L having convex curved display substrates for the display screens. FIG. 13B is representative of a continuous lens structure having lens portions 1310R and 1310L joined together at a center location 1313 of the continuous lens structure. The display devices 1320R and 1320L curve around the temples of the user's head about a third convex curvature C3 to extend a length of the display devices 1320R and 1320L in the direction of the user's ears. The display devices 1320R and 1320L are configured to emanate light out of the display screen toward the lenses 1310R and 1310L, respectively, which in turn is reflected to the wearer by the reflective optical surfaces 1312R and 1312L. The range of illumination from the display devices 1320R and 1320L reaches around the temples of the wearer wherein the light may reach to the far limits of the full human horizontal field of view for reflection into the user's eyes. As can be appreciated, extending the length of the display device 1320R and 1320L by curving the substrate around the temple allows the full human horizontal field of view to be reached.

Assume pixel element 1331R is the rightmost pixel on the display screen of display device 1320R. The pixel element 1331R emanates light along a plurality of rays 1321R and 1322R to the reflective optical surface 1312R. Ray 1322R, emanating from pixel element 1331R, is to the right of ray 1321R, wherein ray 1322R is emanated at the angle A10 (FIG. 10A) of approximately 20°, in some embodiments. The angle A10 may be in the range of 0° to 90° for which light will disperse from the pixel element at a given or predetermined brightness intensity, wherein the intensity changes as the angle changes as shown in FIG. 8. As can be seen, the ray 1324R, to the user's eye, is reflected light representative of the ray 1322R reflected from point B on the reflective optical surface 1312R in the right far peripheral vision field 1340R. Thus, the display device 1320R is able to reach the full human horizontal field for the right eye limits with the ray 1322R relative to the normal being less than 90°. Specifically, the ray 1324R can reach the right far peripheral vision field 1340R.

Similar rays emanated from pixel element 1331L to the reflective optical surface 1312L. The ray reflected from surface 1312L is similar to ray 1324R described above relative to pixel element 1331R. Similarly, the display device 1320L can reach the left far peripheral vision field 1340L from at least pixel element 1331L. Therefore, when displaying CGC, the CGC remains in view of the wearer in at least some or all of the far peripheral vision fields interrupting the full panoramic view capable of the human eyes.

FIGS. 14A-14D illustrate a flowchart of a method 1400 for displaying imagery in the full human field of view using a convex display device. The method 1400 may be performed in the order shown or a different order. One or more blocks may be performed contemporaneously. One or more blocks of the method may be added or deleted, in some embodiments. With reference to FIG. 14A, the method 1400 may include, a block 1401, providing a first convex display device comprising a first substrate with a horizontal convex curvature having a curved geometric profile which continuously curves with smooth transitions in a horizontal dimension. The curved geometric profile is dimensioned to curve around a first temple of a wearer and extend in a direction toward a first ear of a wearer. The first convex display device comprising a plurality of first pixel elements having a first non-Euclidean arrangement along the first substrate.

The method 1400 may include, at block 1402, selectively displaying, from the first convex display device and having a first non-Euclidean arrangement along a first convex curvature, first computer-generated content (CGC) by selected first pixel elements of the plurality of first pixel elements to orient emanated light, representative of the first CGC to a first reflective optical surface of a first optical see-through lens of a head-mounted display (HMD) apparatus associated with a first eye of a wearer.

The method 1400 may include, at block 1404, reflecting from the first reflective optical surface the emanated light from the selected first pixel elements toward the first eye of a wearer to appear in a field of view. The field of view comprises at least a far peripheral vision field of view of the first eye. The non-Euclidean arrangement of the plurality of first pixel elements and paired predetermined surface locations on the first reflective optical surface produces a predetermined brightness intensity of the reflection from said those predetermined surface locations paired with said those selected first pixel elements on the first substrate. The HMD apparatus may include two optical systems. Thus, for a two optical system arrangement or two optical subsystems, the block 1404 may proceed to block 1406 of FIG. 14B.

The selected first pixel elements are configured to emanate first rays of the light for subsequent reflection from the first reflective optical surface toward the first eye by a predetermined intensity angle ° less than 90° according to a normal radiant intensity fall-off verses an angle away from a surface normal to the reflective optical surface, as shown in FIG. 8. The normal to the pixel element of the display device is defined as the start of the pixel luminous intensity graph. The illumination drops off to reach ~0 intensity at 90° away from the normal.

With reference to FIG. 14B, the method 1400 may include, at step 1406, providing a second convex display device comprising a second substrate with a horizontal convex curvature having a curved geometric profile which continuously curves with smooth transitions in the horizontal dimension. The curved profile is dimensioned to curve around a second temple of the wearer and extend in a direction toward a second ear of the wearer.

The method 1400 may include, at block 1408, selectively displaying, from a second convex display device having a plurality of second pixel elements arranged the second convex display device in a second non-Euclidean arrangement along a second convex curvature, second computer-generated content by selected second pixel elements which emanate light to a second reflective optical surface of a second optical see-through lens of the head-mounted display (HMD) apparatus associated with a second eye. The method 1400 may include, at block 1410, reflecting from the second reflective optical surface the emanated light from the selected second pixel elements in a second field of view wherein the field of view comprises at least a far peripheral vision field of the second eye. The non-Euclidean arrangement of the plurality of second pixel elements and paired predetermined surface locations on the second reflective optical surface produces a predetermined brightness intensity of the reflection from said those predetermined surface locations paired with said those selected second pixel elements on the second substrate. The convex curvature of the first and second display devices and a curvature of the first and second reflective optical surfaces reflects the computer-generated content to appear by reflection in the horizontal human field of view including right and left far peripheral vision fields and, in some embodiment, to appear up to the full horizontal human field of view.

The selected second pixel elements are configured to emanate second rays of the light for subsequent reflection from the second reflective optical surface toward the second eye by an intensity angle according to a normal radiant intensity fall-off verses an angle away from a surface normal to the reflective optical surface, as shown in FIG. 8.

It should be noted that there is only one reflection per pixel element, which comes from whatever location the lens has been engineered to send (reflect) light from. The lens has reflective areas that have particular angles and distances so that it forces the light from a respective one pixel element to be only reflected from one predetermined location on the reflective optical surface. So even though the pixel element is radiating light in a hemisphere, with intensities as described in FIG. 8, the light is only reflected from one point, as engineered into the lens.

With reference to FIG. 14C, in some embodiments, the first convex substrate further comprises a top side and a bottom side with a vertical convex curvature being curved continuously with smooth transitions in a vertical dimension between the top side and the bottom side and in a direction toward the forehead of the wearer. Thus, the step of block 1402 of the method 1400 may further include, at block 1403, selectively displaying, from the first convex display, by a set of pixel elements configured, upon selection, to orient emanated light representative of the CGC or a portion of the CGC toward the first reflective optical surface for reflection of the CGC or the portion of the CGC to appear in a human vertical vision field of view of the first eye.

With reference to FIG. 14D, in some embodiments, the second convex substrate further comprises a top side and a bottom side with a vertical convex curvature being curved continuously with smooth transitions in a vertical dimension between the top side and the bottom side and in a direction toward the forehead of the wearer. Thus, the step of block 1408 of the method 1400 may include selectively displaying, from the second convex display, by a set of pixel elements configured, upon selection, to orient emanated light representative of the CGC or a portion of the CGC toward the second reflective optical surface for reflection of the CGC or the portion of the CGC to appear in a human vertical vision field of view of the second eye.

FIG. 15 illustrates a head-mounted display (HMD) apparatus 100 with a control system 1550. A controller may also be a control system 1550 or may be a separate processor interfaced with a main computing device. The control system 1550 may include a computing device. The head-mounted display (HMD) apparatus 100 may also include a vision capture system 1540 and a communication system 1545. The communication system 1545 may communicate with wireless communication systems via cellular communications, satellite communications, and mobile communications. The communication system 1545 may communicate using a Bluetooth protocol or other short range wireless protocols. The communication system 1545 may include an antenna 1546 and receivers and transmitters (not shown). The control system 1550 described herein may also be used with HMD apparatus 1300.

The head-mounted display (HMD) apparatus 100 may also include an inertial navigation system 1535 which may include gyroscopes and accelerometers (not shown) for tracking the location of the HMD apparatus including the location of the HMD apparatus with respect to the real world. The HMD apparatus 100 may include other navigational systems such as a global positioning system (GPS). The location determination may be useful in displaying CGC on the reflective optical surface of the lenses 110R and 110L via one or both of the convex display devices 120R and 120L, respectively. The optical systems (i.e., optical systems 105R and 105L) have been described in relation to FIG. 5B, for example.

The control system 1550 may include one or more processors 1552, system memory 1553 and hard drive 1554. Depending on the exact configuration and type of a control system 1550, system memory 1553 may be volatile (such as RAM 1556), non-volatile (such as read only memory (ROM 1558), flash memory 1560, and the like) or some combination thereof. System memory 1553 may store operating system 1564, one or more applications 1575, and may include program data for performing one or more operations, functions, methods and processes described herein.

The control system 1550 may also have additional features or functionality. For example, the control system 1550 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by the computing device. Any such computer storage media may be part of the device.

The control system 1550 may also include or have interfaces for input device(s) (not shown) such as a keyboard, mouse, pen, voice input device, touch input device, etc. The control system 1550 may include or have interfaces for connection to output device(s) such as display devices 120R and 120L via display drivers 1562, speakers, etc. The control system 1550 may include a peripheral bus 1566 for connecting to peripherals. The control system 1550 may contain communication connection(s) that allow the communication systems 1545 to communicate with other computing devices, such as over a network or a wireless network. By way of example, and not limitation, communication connection(s) and protocols may be compatible with wired media such as a wired network or direct-wired connection, and wireless media such as acoustic, radio frequency (RF), infrared and other wireless media of the communication system 1545. The control system 1550 may include a network interface card 1568 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as firmware in a RAM, a ROM and a flash memory. Otherwise, the code can be stored in a tangible computer-readable storage medium such as a magnetic tape, a flexible disc, a hard disc, a compact disc, a photo-magnetic disc, or a digital versatile disc (DVD).

The applications 1575 may include, among other applications, an ultrawide panoramic display application 1576 to display CGC, images or video content across the reflective optical surfaces of both lenses 110R and 110L to include images within the right and left far peripheral vision fields simultaneously to form an ultrawide panoramic display up to the full human horizontal field of view and/or the full human vertical field of view. The applications may include an ultrawide virtual reality (VR) application 1577 and an ultrawide augmented reality (AR) application 1578. The ultrawide VR application 1577 may select the pixel elements in the curved display device to display VR images or scenes to appear by reflection to the eye anywhere up to the full human vision field both horizontally and vertically. The ultrawide AR application 1578 may select the pixel elements in the curved display device to display AR images or data to appear by reflection anywhere up to the full human vision field both vertically and horizontally. Therefore, the CGC reflected to the wearer's eyes may not disappear in the vertical vision limits or the horizontal peripheral field limits of the wearer's natural vision field. Thus, the computer system 1550 is configured as a special-purpose computer system for use with an HMD apparatus 100 or 1300.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:
1. A head-mounted display (HMD) apparatus comprising:
at least one optical system, each optical system comprising a lens having a reflective optical surface and a head-mounted display device associated with and distanced from the reflective optical surface, the head-mounted display device comprising:
a substrate having a horizontal convex curvature with a curved geometric profile which continuously curves with smooth transitions in a horizontal dimension,
the curved geometric profile dimensioned to curve around a respective temple of a wearer and extend in a direction toward a respective ear of the wearer,
the substrate comprising a plurality of pixel elements arranged along the horizontal convex curvature and being controlled to selectively radiate light representative of computer-generated content (CGC) to the associated reflective optical surface such that those selected pixel elements for display emanate rays of the light for subsequent reflection and collimation from the reflective optical surface in a direction toward a respective one eye of the wearer, the horizontal convex curvature of the substrate being structured to track a curvature of the lens.

2. The HMD apparatus of claim 1, wherein:
the curved geometric profile of the horizontal convex curvature of the substrate being dimensioned to traverse across a brow or forehead of the wearer and wrap around the respective temple of the wearer and above the respective one eye of the wearer, the substrate having a first side extending in a direction toward the respective ear of the wearer; and
the plurality of pixel elements, arranged on the substrate, have a non-Euclidean arrangement wherein at least one pixel element, upon selection, are arranged to orient the emanated light therefrom representative of the CGC or a portion of the CGC in a direction toward the associated reflective optical surface to at least one predetermined surface location paired with the at least one pixel element for reflection of the CGC or the portion of the CGC from the at least one predetermined surface location to the respective one eye to appear in a far horizontal peripheral vision field of view of the respective one eye, based on an arrangement of the at least one predetermined surface location relative to the far horizontal peripheral vision field of view for the respective one eye.

3. The HMD apparatus of claim 1, wherein:
the substrate further comprising a top side and a bottom side with a vertical convex curvature being curved continuously with smooth transitions in a vertical dimension between the top side and the bottom side and in a direction toward a forehead of the wearer; and
the plurality of pixel elements, arranged on the substrate, have a non-Euclidean arrangement wherein at least one pixel element, upon selection, are arranged to orient the emanate light therefrom representative of the CGC or a portion of the CGC in a direction toward the associated reflective optical surface to at least one predetermined surface location for reflection of the CGC or the portion of the CGC from the at least one predetermined surface location to the respective one eye to appear in a human vertical vision field of view of the respective one eye based on an arrangement of the at least one predetermined surface location relative to a human horizontal vision field of view for the respective one eye.

4. The HMD apparatus of claim 1, wherein a human horizontal vision field of view for the respective one eye is a full human horizontal vision field of view for the respective one eye.

5. The HMD apparatus of claim 1, wherein the plurality of pixel elements, upon selection, are arranged to orient the emanated light representative of the CGC in a direction toward the associated reflective optical surface to those predetermined surface locations paired with those selected pixel elements for reflection from said those predetermined surface locations to the respective one eye such that the CGC appears in a field of view, the field of view being one or more of a central focal vison field of view, a near peripheral vision field of view, a mid peripheral vision field of view, a far peripheral vision field of view and a full human horizontal field of view of the respective one eye based on an arrangement of said those predetermined surface locations relative to the full human horizontal field of view for the respective one eye.

6. The HMD apparatus of claim 5, wherein the field of view comprises the far peripheral vision field and the head-mounted display device comprises a convex curved display screen wherein a brightness intensity of the reflection from said those predetermined surface locations paired with said those selected pixel elements of the convex curved display screen has an increase in brightness intensity on a normal radiant intensity fall-off verses an angle away from a surface normal in the far peripheral vision field of view relative to the predetermined surface locations on the reflective optical surface paired with selected pixel elements of a flat display screen for reflection in the far peripheral vision field.

7. The HMD apparatus of claim 1, further comprising a control system including a processor, a communication system and a vision system.

8. The HMD apparatus of claim 1, wherein:
the at least one optical system comprising a first optical system and a second optical system to form a pair of optical systems for a pair of eyes of the wearer;
the lens of the first optical system being a first lens and the reflective optical surface of the first lens being a first reflective optical surface;
the head-mounted display device of the first optical system being a first head-mounted display device;
the lens of the second optical system being a second lens and the reflective optical surface of the second lens being a second reflective optical surface;
the head-mounted display device of the second optical system being a second head-mounted display device;
the first reflective optical surface comprises a plurality of first oxels, each oxel of the plurality of first oxels is partially determined by a location of each pixel element of the plurality of pixel elements of the first head-mounted display device; and
the second reflective optical surface comprises a plurality of second oxels, each oxel of the plurality of second oxels is partially determined by a location of each pixel element of the plurality of pixel elements of the second head-mounted display device.

9. The HMD apparatus of claim 1, wherein:
the at least one optical system comprising a single optical system having a first optical subsystem and a second optical subsystem for a pair of eyes of the wearer;

the lens of the single optical system being a continuous lens structure with a first lens portion for the first optical subsystem and the reflective optical surface of the first lens portion being a first reflective optical surface;

the head-mounted display device of the single optical system comprising a first head-mounted display device being part of the first optical subsystem and associated with the first lens portion;

the lens of the single optical system includes a second lens portion for the second optical subsystem and the reflective optical surface of the second lens portion being a second reflective optical surface;

the head-mounted display device of the single optical system comprising a second head-mounted display device being part of the second optical subsystem and associated with the second lens portion;

the first reflective optical surface comprises a plurality of first oxels, each oxel of the plurality of first oxels is partially determined by a location of each pixel element of the plurality of pixel elements of the first head-mounted display device; and the second reflective optical surface comprises a plurality of second oxels, each oxel of the plurality of second oxels is partially determined by a location of each pixel element of the plurality of pixel elements of the second head-mounted display device.

10. A head-worn display device for a head-mounted display (HMD) apparatus having at least one optical system including a lens with a curved reflective optical surface associated with the head-worn display device, the head-worn display device comprising:

a convex substrate with a horizontal convex curvature having a curved geometric profile which continuously curves with smooth transitions in a horizontal dimension, the curved geometric profile dimensioned to curve around a respective temple of a wearer and extend in a direction toward a respective ear of the wearer; and a plurality of pixel elements coupled to the convex substrate and arranged to have a non-Euclidean arrangement along the horizontal convex curvature, the plurality of pixel elements being configured to selectively radiate light representative of computer-generated content (CGC) to the reflective optical surface having predetermined surface locations with each predetermined surface location paired with a pixel element of the plurality of pixel elements such that those selected pixel elements for display of the CGC being configured to emanate rays of the light in a field of view for subsequent reflection from the paired predetermined surface locations, in a direction toward the eye of the wearer wherein the field of view comprises at least a far peripheral vision field of view and the non-Euclidean arrangement of the plurality of pixel elements and paired predetermined surface locations produces a predetermined brightness intensity of the reflection from said those predetermined surface locations paired with said those selected pixel elements on the convex substrate, the horizontal convex curvature of the substrate being structured to track a curvature of the lens.

11. The display device of claim 10, wherein:

the curved geometric profile of the horizontal convex curvature of the convex substrate being dimensioned to traverse across a brow or forehead of the wearer and wrap around the respective temple of the wearer and above the respective one eye of the wearer, the substrate having a first side extending in a direction toward the respective ear of the wearer; and at least one pixel element of the plurality of pixel elements, upon selection, to orient the emanated light therefrom representative of the CGC or a portion of the CGC in a direction toward the associated reflective optical surface to at least one predetermined surface location paired with the at least one pixel element for reflection of the CGC or the portion of the CGC from the at least one predetermined surface location to the respective one eye to appear in a far horizontal peripheral vision field of view of the respective one eye based on the arrangement of the at least one predetermined surface location relative to the far horizontal peripheral vision field of view for the respective one eye.

12. The display device of claim 11, wherein:

the convex substrate further comprising a top side and a bottom side with a vertical convex curvature being curved continuously with smooth transitions in a vertical dimension between the top side and the bottom side and in a direction toward the forehead of the wearer; and the plurality of pixel elements arranged on the substrate further comprising a set of pixel elements configured, upon selection, to orient emanated light representative of the CGC or a portion of the CGC in a direction toward the associated reflective optical surface for reflection of the CGC or the portion of the CGC to appear in a human vertical vision field of view of the respective one eye.

13. The display device of claim 10, wherein the plurality of pixel elements comprises equally spaced pixel elements.

14. The display device of claim 10, wherein the far peripheral vision field of view includes up to a limit of the far peripheral vision field of view according to a full human horizontal field of view of the respective one eye based on an arrangement of said those predetermined surface locations relative to the full human horizontal field of view for the respective one eye.

15. A method comprising:

providing first convex display device comprising a first substrate with a horizontal convex curvature having a curved geometric profile which continuously curves with smooth transitions in a horizontal dimension, the curved geometric profile dimensioned to curve around a first temple of a wearer and extend in a direction toward a first ear of a wearer and the first convex display device comprising a plurality of first pixel elements having a first non-Euclidean arrangement along the first substrate;

selectively displaying, from the first convex display, first computer-generated content (CGC) by selected first pixel elements of the plurality of first pixel elements to orient emanated light, representative of the first CGC to a first reflective optical surface of a first optical see-through lens of a head-mounted display (HMD) apparatus associated with a first eye of the wearer; and reflecting from the first reflective optical surface the emanated light from the selected first pixel elements in a direction toward the first eye of a wearer to appear in a field of view, wherein the field of view comprises at least a far peripheral vision field of view of the first eye and the non-Euclidean arrangement of the plurality of first pixel elements and paired predetermined surface locations on the first reflective optical surface produces a predetermined brightness intensity of the reflection from said those predetermined surface locations paired with said those selected first pixel elements on the first substrate, the horizontal convex curvature of the first substrate being structured to track a curvature of the lens.

16. The method of claim 15, further comprising:
providing a second convex display device comprising a second substrate with a horizontal convex curvature having a curved geometric profile which continuously curves with smooth transitions in the horizontal dimension, the curved geometric profile dimensioned to curve around a second temple of the wearer and extend in a direction toward a second ear of the wearer and the second convex display device comprising a plurality of second pixel elements having a second non-Euclidean arrangement along the second substrate;
selectively displaying, from the second convex display device having the plurality of second pixel elements arranged on the second convex display device in a second non-Euclidean arrangement, second CGC by selected second pixel elements to emanate light to a second reflective optical surface of a second optical see-through lens of the head-mounted display (HMD) apparatus associated with a second eye of the wearer; and
reflecting from the second reflective optical surface the emanated light from the selected second pixel elements in a second field of view wherein the field of view comprises at least a far peripheral vision field of view of the second eye and the non-Euclidean arrangement of the plurality of second pixel elements and paired predetermined surface locations on the second reflective optical surface produces a predetermined brightness intensity of the reflection from said those predetermined surface locations paired with said those selected second pixel elements on the second substrate.

17. The method of claim 15, wherein the far peripheral vision field of view for the first eye includes up to a limit of the far peripheral vision field of view according to the full human horizontal vision field of view for the first eye.

18. The method of claim 15, wherein:
the first convex substrate further comprising a top side and a bottom side with a vertical convex curvature being curved continuously with smooth transitions in a vertical dimension between the top side and the bottom side and in a direction toward the forehead of the wearer; and
selectively displaying, from the first convex display, by a set of pixel elements configured, upon selection, to orient emanated light representative of the CGC or a portion of the CGC in a direction toward the first reflective optical surface for reflection of the CGC or the portion of the CGC to appear in a human vertical vision field of view of the first eye.

19. The method of claim 15, wherein the plurality of first pixel elements comprises equally spaced pixel elements in the first non-Euclidean arrangement along the first substrate.

20. The method of claim 15, wherein the first reflective optical surface comprises a plurality of oxels, each oxel of the first reflective optical surface is partially determined by a location of each pixel element of the first convex display device.

* * * * *